United States Patent
Birklbauer et al.

(10) Patent No.: US 12,446,775 B2
(45) Date of Patent: Oct. 21, 2025

(54) EYEWEAR WITH INTER-PUPILLARY DISTANCE ESTIMATION

(71) Applicant: Snap Inc., Santa Monica, CA (US)

(72) Inventors: Clemens Birklbauer, Vienna (AT); Matthias Kalkgruber, Vienna (AT); Tiago Miguel Pereira Torres, Vienna (AT); Yubin Xi, San Jose, CA (US); Kai Zhou, Wr Neudorf (AT)

(73) Assignee: Snap Inc., Santa Monica, CA (US)

( * ) Notice: Subject to any disclaimer, the term of this patent is extended or adjusted under 35 U.S.C. 154(b) by 386 days.

(21) Appl. No.: 18/133,870

(22) Filed: Apr. 12, 2023

(65) Prior Publication Data
US 2024/0341591 A1    Oct. 17, 2024

(51) Int. Cl.
*A61B 3/11* (2006.01)
(52) U.S. Cl.
CPC ..................... *A61B 3/111* (2013.01)
(58) Field of Classification Search
CPC .............. A61B 3/111; A61B 3/04; A61B 3/08
USPC ........................................................ 351/204
See application file for complete search history.

(56) References Cited

U.S. PATENT DOCUMENTS

| | | | |
|---|---|---|---|
| 10,671,118 B1 | 6/2020 | Zhang | |
| 2018/0256072 A1* | 9/2018 | Massonneau | ........ A61B 5/1071 |
| 2019/0068944 A1 | 2/2019 | Zhang et al. | |
| 2020/0107720 A1* | 4/2020 | Xiong | .............. A61B 3/024 |
| 2020/0196860 A1* | 6/2020 | Lebrun | .................. A61B 3/111 |
| 2020/0233213 A1 | 7/2020 | Porter et al. | |
| 2020/0387014 A1 | 12/2020 | Smyth et al. | |

FOREIGN PATENT DOCUMENTS

WO    WO-2023031633 A1 *  3/2023  .............. G06F 3/011

OTHER PUBLICATIONS

International Search Report and Written Opinion for International Application No. PCT/US2024/022745, dated Jul. 1, 2024 (Jan. 7, 2024)—12 pages.

* cited by examiner

*Primary Examiner* — Stephone B Allen
*Assistant Examiner* — Leonidas Boutsikaris
(74) *Attorney, Agent, or Firm* — CM Law; Stephen J. Weed

(57) ABSTRACT

An eyewear device including a sensor used to measure deformation of an eyewear frame to estimate an inter-pupillary distance (IPD) of an eyewear user. The sensor is used to determine head breadth (HB) of the user and to estimate the IPD of the user. A processor displays an image on a display of the eyewear as a function of the estimated IPD to improve virtual object rendering for an improved augmented reality (AR) viewing experience while reducing vergence accommodation mismatch (VAM). User profile data, such as age and gender, can be used to generate a more accurate estimated IPD of the user.

20 Claims, 20 Drawing Sheets

EYEWEAR WITH INTER-PUPILLARY DISTANCE ESTIMATION

TECHNICAL FIELD

The present subject matter relates to eyewear devices, e.g., smart glasses having cameras and see-through displays.

BACKGROUND

Eyewear devices, such as smart glasses, headwear, and headgear available today integrate cameras, see-through displays, and antennas. Such devices have various electronic components and sensors.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Eyewear including a sensor for measuring deformation to estimate a user's inter-pupillary distance (IPD). The sensor is used to determine head breadth (HB) for estimating the IPD. A processor displays an image on a display of the eyewear as a function of the estimated IPD to improve virtual object rendering for an improved augmented reality (AR) viewing experience while reducing vergence accommodation mismatch (VAM). User profile data, such as age and gender, can be used to generate a more accurate estimated IPD.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The term "coupled" as used herein refers to any logical, optical, physical, or electrical connection, link, or the like by which signals or light produced or supplied by one system element are imparted to another coupled element. Unless described otherwise, coupled elements or devices are not necessarily directly connected to one another and may be separated by intermediate components, elements or communication media that may modify, manipulate, or carry the light or signals.

The orientations of the eyewear device, associated components and any complete devices incorporating an eye scanner and camera such as shown in any of the drawings, are given by way of example only, for illustration and discussion purposes. In operation for a particular variable optical processing application, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Reference now is made in detail to the examples illustrated in the accompanying drawings and discussed below.

Figure 1A:
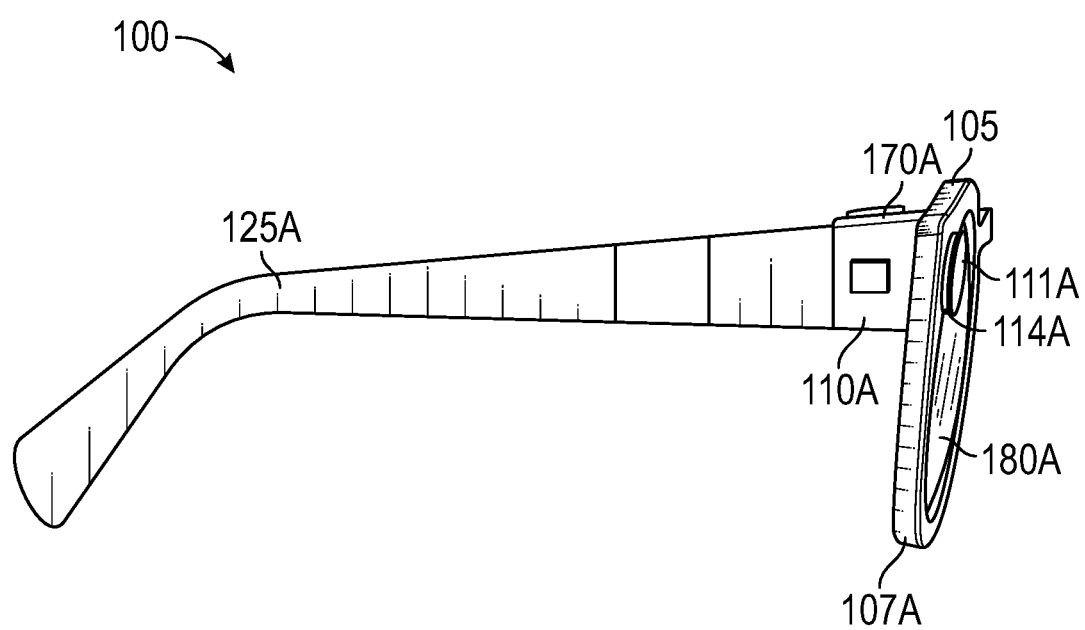
FIG. 1A is a side view of an example hardware configuration of an eyewear device, which shows an optical assembly with an image display, and field of view adjustments are applied to a user interface presented on the image display based on detected head or eye movement by a user.
Figure 2A:
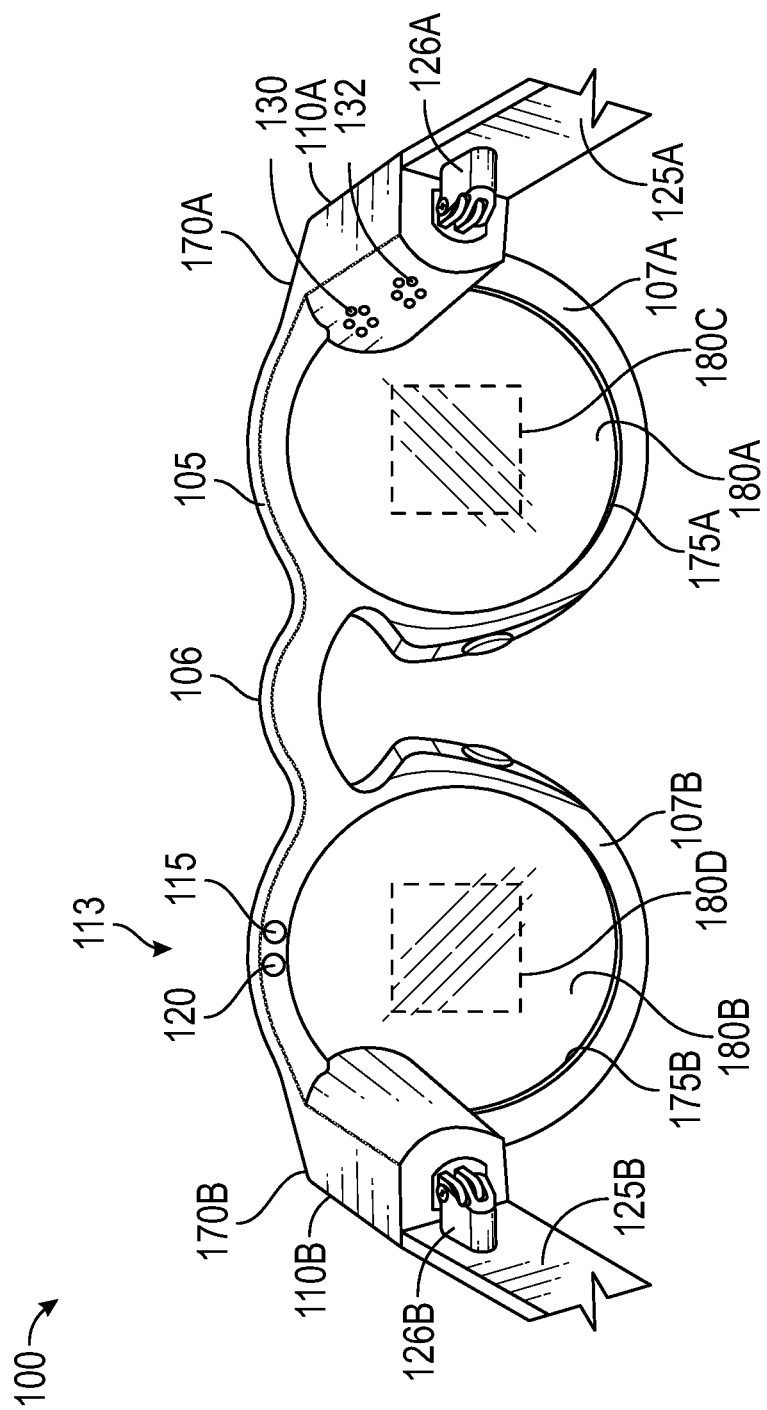
FIG. 2A is a rear view of an example hardware configuration of an eyewear device, which includes an eye scanner on a frame, for use in a system for identifying a user of the eyewear device.

FIG. 1A is a side view of an example hardware configuration of an eyewear device 100, which includes an optical assembly 180B (e.g., positioned on a right side of the eyewear device 100 as illustrated) with an image display 180D (FIG. 2A). Eyewear device 100 includes multiple visible light cameras 114A-B (FIG. 7) that form a stereo camera, of which the visible light camera 114B is located on a temple portion 110B.

The visible light cameras 114A-B (e.g., positioned on the left and sides of the eyewear device 100 as illustrated) have an image sensor that is sensitive to the visible light range wavelength. Each of the visible light cameras 114A-B have a different frontward facing angle of coverage, for example, visible light camera 114B has the depicted angle of coverage 111B. The angle of coverage is an angle range which the image sensor of the visible light camera 114A-B picks up electromagnetic radiation and generates images. Examples of such visible lights camera 114A-B include a high-resolution complementary metal-oxide-semiconductor (CMOS) image sensor and a video graphic array (VGA) camera, such as 640p (e.g., 640×480 pixels for a total of 0.3 megapixels), 720p, or 1080p. Image sensor data from the visible light cameras 114A-B are captured along with geolocation data, digitized by an image processor, and stored in a memory.

To provide stereoscopic vision, visible light cameras 114A-B may be coupled to an image processor (element 912 of FIG. 9) for digital processing along with a timestamp in which the image of the scene is captured. Image processor 912 includes circuitry to receive signals from the visible light camera 114A-B and process those signals from the visible light cameras 114A-B into a format suitable for storage in the memory (element 934 of FIG. 9). The timestamp can be added by the image processor 912 or other processor, which controls operation of the visible light cameras 114A-B. Visible light cameras 114A-B allow the stereo camera to simulate human binocular vision. Stereo cameras provide the ability to reproduce three-dimensional images (element 715 of FIG. 7) based on two captured images (elements 758A-B of FIG. 7) from the visible light cameras 114A-B, respectively, having the same timestamp. Such three-dimensional images 715 allow for an immersive life-like experience, e.g., for virtual reality or video gaming. For stereoscopic vision, the pair of images 758A-B are generated at a given moment in time-one image for each of the visible light cameras 114A-B. When the pair of generated images 758A-B from the frontward facing angles of coverage 111A-B of the visible light cameras 114A-B are stitched together (e.g., by the image processor 912), depth perception is provided by the optical assembly 180A-B.

In an example, a user interface field of view adjustment system includes the eyewear device 100. The eyewear device 100 includes a frame 105, a temple portion 110B extending from a lateral side 170B of the frame 105, and a see-through image display 180D (FIGS. 2A-B) comprising optical assembly 180B to present a graphical user interface to a user. The eyewear device 100 includes a visible light camera 114A connected to the frame 105 or a temple portion 110A to capture an image of the scene. Eyewear device 100 further includes another visible light camera 114B connected to the frame 105 or another temple portion 110B to capture (e.g., at least substantially simultaneously with the visible light camera 114A) another image of the scene, which partially overlaps the image. Although not shown in FIGS. 1A-B, the user interface field of view adjustment system further includes the processor 932 coupled to the eyewear device 100 and connected to the visible light cameras 114A-B, the memory 934 accessible to the processor 932, and programming in the memory 934, for example in the eyewear device 100 itself or another part of the user interface field of view adjustment system.

Figure 1B:
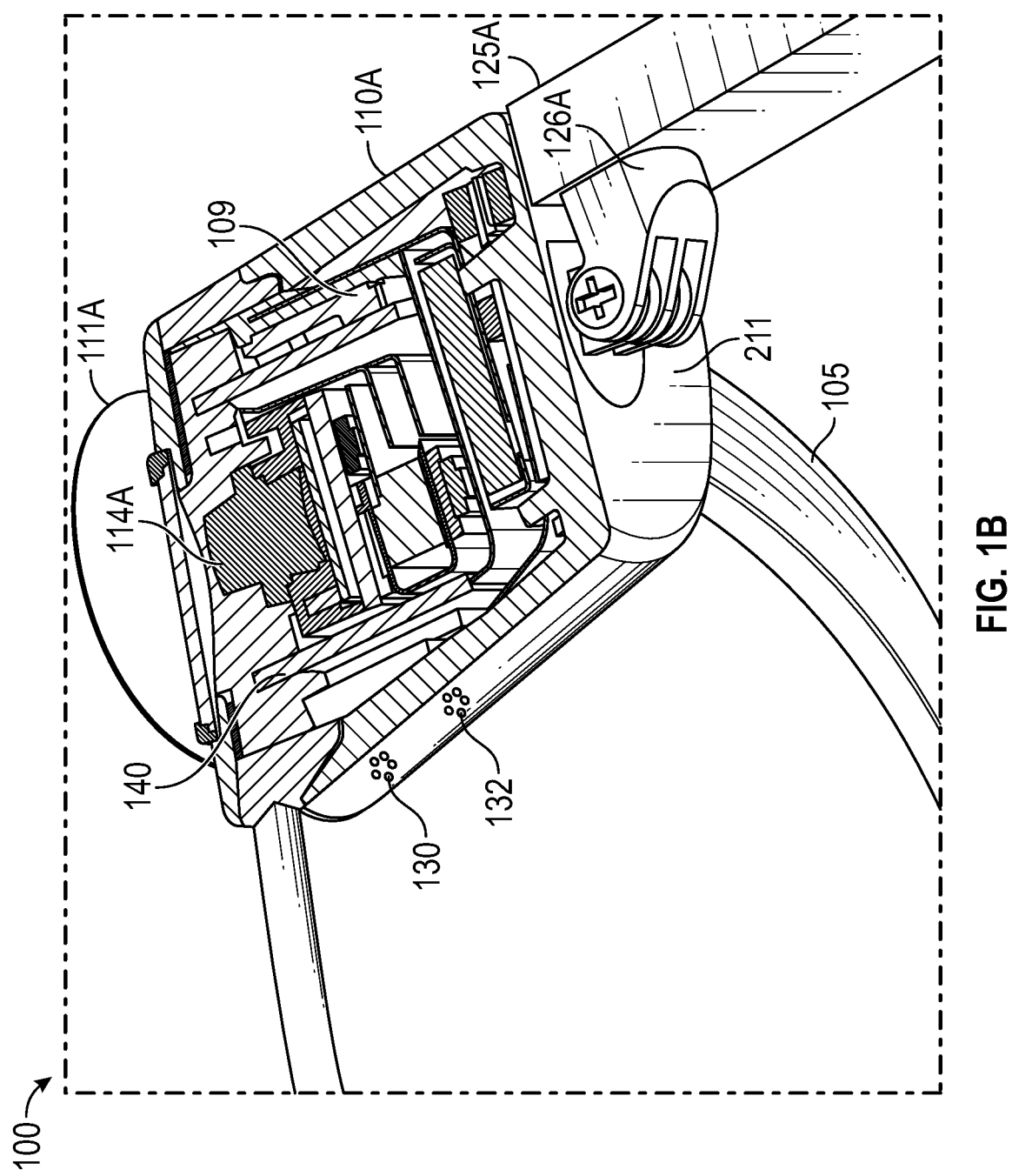
FIG. 1B is a top cross-sectional view of a temple of the eyewear device of FIG. 1A depicting a visible light camera, a head movement tracker for tracking the head movement of the user of the eyewear device, and a circuit board.
Figure 2B:
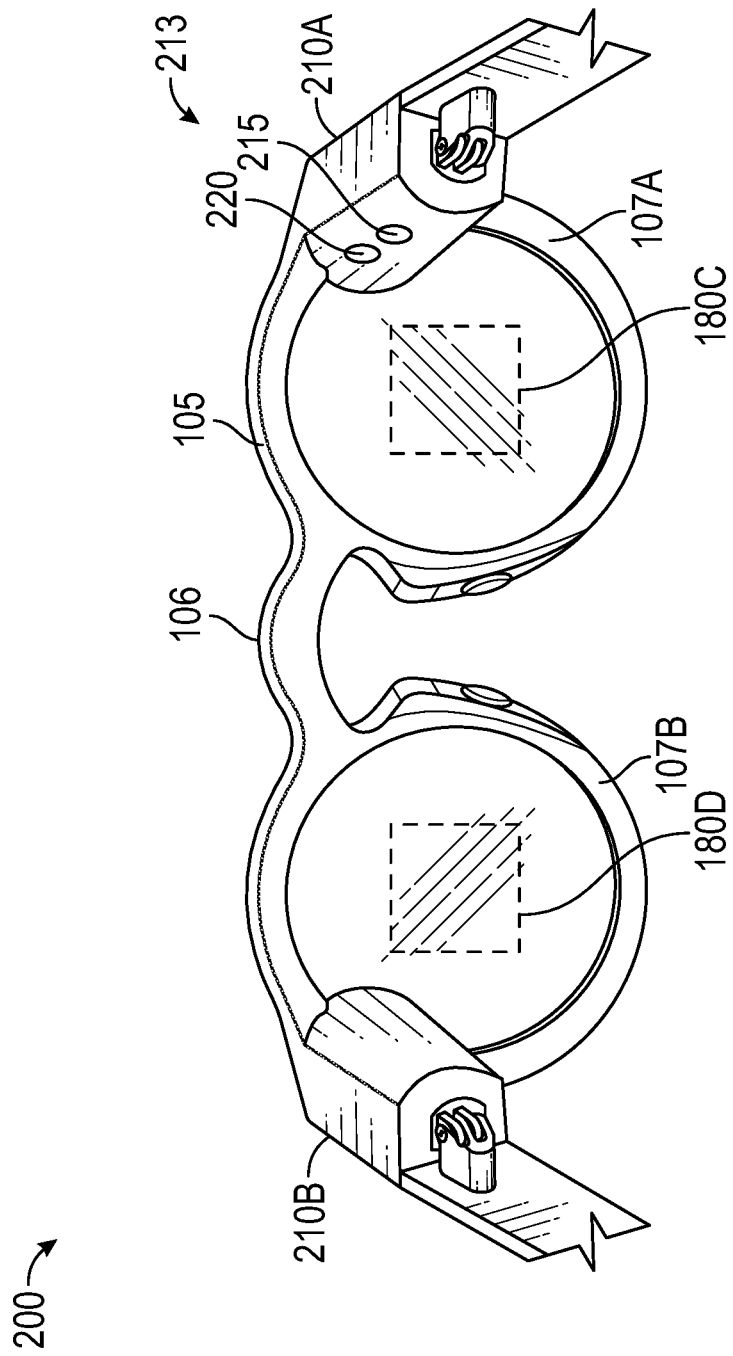
FIG. 2B is a rear view of an example hardware configuration of another eyewear device, which includes an eye scanner on a temple, for use in a system for identifying a user of the eyewear device.

Although not shown in FIG. 1A, the eyewear device 100 also includes a head movement tracker (element 109 of FIG. 1B) or an eye movement tracker (element 213 of FIG. 2B). Eyewear device 100 further includes the see-through image displays 180C-D of optical assembly 180A-B for presenting a sequence of displayed images, and an image display driver (element 942 of FIG. 9) coupled to the see-through image displays 180C-D of optical assembly 180A-B to control the image displays 180C-D of optical assembly 180A-B to present the sequence of displayed images 715, which are described in further detail below. Eyewear device 100 further includes the memory 934 and the processor 932 having access to the image display driver 942 and the memory 934. Eyewear device 100 further includes programming (element 934 of FIG. 9) in the memory. Execution of the programming by the processor 932 configures the eyewear device 100 to perform functions, including functions to present, via the see-through image displays 180C-D, an initial displayed image of the sequence of displayed images, the initial displayed image having an initial field of view corresponding to an initial head direction or an initial eye gaze direction (element 230 of FIG. 5).

Execution of the programming by the processor 932 further configures the eyewear device 100 to detect movement of a user of the eyewear device by: (i) tracking, via the head movement tracker (element 109 of FIG. 1B), a head movement of a head of the user, or (ii) tracking, via an eye movement tracker (element 213 of FIG. 2B, FIG. 5), an eye movement of an eye of the user of the eyewear device 100. Execution of the programming by the processor 932 further configures the eyewear device 100 to determine a field of view adjustment to the initial field of view of the initial displayed image based on the detected movement of the user. The field of view adjustment includes a successive field of view corresponding to a successive head direction or a successive eye direction. Execution of the programming by the processor 932 further configures the eyewear device 100 to generate a successive displayed image of the sequence of displayed images based on the field of view adjustment. Execution of the programming by the processor 932 further configures the eyewear device 100 to present, via the see-through image displays 180C-D of the optical assembly 180A-B, the successive displayed images.

FIG. 1B is a top cross-sectional view of the temple of the eyewear device 100 of FIG. 1A depicting the visible light camera 114B, a head movement tracker 109, and a circuit board. Construction and placement of the visible light camera 114A is substantially similar to the visible light camera 114B, except the connections and coupling are on the lateral side 170A. As shown, the eyewear device 100 includes the visible light camera 114B and a circuit board, which may be a flexible printed circuit board (PCB) 140. The hinge 126B connects the temple portion 110B to a temple 125B of the eyewear device 100. In some examples, components of the visible light camera 114B, the flexible PCB 140, or other electrical connectors or contacts may be located on the temple 125B or the hinge 126B.

As shown, eyewear device 100 has a head movement tracker 109, which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyro, and magnetometer per axis for each of the three axes: horizontal axis for left-right movement (X), vertical axis (Y) for top-bottom movement, and depth or distance axis for up-down movement (Z). The magnetometer measures the magnetic field direction (e.g., facing south, north, etc. like a compass which generates a heading reference) and magnitude. The three accelerometers detect acceleration along the horizontal, vertical, and depth axis defined above, which can be defined relative to the ground, the eyewear device 100, or the user wearing the eyewear device 100. The gyroscope measures angular velocity around the previously mentioned X, Y and Z axes.

Eyewear device 100 detects movement of the user of the eyewear device 100 by tracking, via the head movement tracker 109, the head movement of the head of the user. The head movement includes a variation of head direction on a horizontal axis, a vertical axis, or a combination thereof from the initial head direction during presentation of the initial displayed image on the image display. In one example, tracking, via the head movement tracker 109, the head movement of the head of the user includes measuring, via the inertial measurement unit 109, the initial head direction on the horizontal axis (e.g., X axis), the vertical axis (e.g., Y axis), or the combination thereof (e.g., transverse or diagonal movement). Tracking, via the head movement tracker 109, the head movement of the head of the user further includes measuring, via the inertial measurement unit 109, a successive head direction on the horizontal axis, the vertical axis, or the combination thereof during presentation of the initial displayed image.

Tracking, via the head movement tracker 109, the head movement of the head of the user further includes determining the variation of head direction based on both the initial head direction and the successive head direction. Detecting movement of the user of the eyewear device 100 further includes in response to tracking, via the head movement tracker 109, the head movement of the head of the user, determining that the variation of head direction exceeds a deviation angle threshold on the horizontal axis, the vertical axis, or the combination thereof. The deviation angle threshold is between about 3° to 10°. As used herein, the term "about" when referring to an angle means±10% from the stated amount.

Variation along the horizontal axis slides three-dimensional objects, such as characters, Bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the eyewear device 100 may power down.

The temple portion 110B includes temple body 211 and a temple cap, with the temple cap omitted in the cross-section of FIG. 1B. Disposed inside the temple portion 110B are various interconnected circuit boards, such as PCBs or flexible PCBs, that include controller circuits for visible light camera 114B, microphone(s) 130, speaker(s) 132, low-power wireless circuitry (e.g., for wireless short-range network communication via Bluetooth™), high-speed wireless circuitry (e.g., for wireless local area network communication via WiFi).

The visible light camera 114B is coupled to or disposed on the flexible PCB 140 and covered by a visible light camera cover lens, which is aimed through opening(s) formed in the temple portion 110B. In some examples, the frame 105 connected to the temple portion 110B includes the opening(s) for the visible light camera cover lens. The frame 105 includes a front-facing side configured to face outwards away from the eye of the user. The opening for the visible light camera cover lens is formed on and through the front-facing side. In the example, the visible light camera 114B has an outwards facing angle of coverage 111B with a line of sight or perspective of an eye (e.g., right eye) of the user of the eyewear device 100. The visible light camera cover lens can also be adhered to an outwards facing surface of the temple portion 110B in which an opening is formed with an outwards facing angle of coverage, but in a different outwards direction. The coupling can also be indirect via intervening components.

A visible light camera 114A is connected to the see-through image display 180C of optical assembly 180A to generate a background scene of a successive displayed image. Another visible light camera 114B is connected to the see-through image display 180D of optical assembly 180B to generate another background scene of a successive displayed image. The background scenes partially overlap to present a three-dimensional observable area of the successive displayed image.

Flexible PCB 140 is disposed inside the temple portion 110B and is coupled to one or more other components housed in the temple portion 110B. Although shown as being formed on the circuit boards of the temple portion 110B, the visible light camera 114B can be formed on the circuit boards of the temple portion 110A, the temples 125A-B, or frame 105.

FIG. 2A is a rear view of an example hardware configuration of an eyewear device 100, which includes an eye scanner 113 on a frame 105, for use in a system for determining an eye position and gaze direction of a wearer/user of the eyewear device 100. As shown in FIG. 2A, the eyewear device 100 is in a form configured for wearing by a user, which are eyeglasses in the example of FIG. 2A. The eyewear device 100 can take other forms and may incorporate other types of frameworks, for example, headgear, a headset, or a helmet.

In the eyeglasses example, eyewear device 100 includes the frame 105 which includes the rim 107A connected to the rim 107B via the bridge 106 adapted for a nose of the user. The rims 107A-B include respective apertures 175A-B which hold the respective optical element 180A-B, such as a lens and the see-through displays 180C-D. As used herein, the term lens is meant to cover transparent or translucent pieces of glass or plastic having curved and flat surfaces that cause light to converge/diverge or that cause little or no convergence/divergence.

Although shown as having two optical elements 180A-B, the eyewear device 100 can include other arrangements, such as a single optical element depending on the application or intended user of the eyewear device 100. As further shown, eyewear device 100 includes the temple portion 110A adjacent the lateral side 170A of the frame 105 and the temple portion 110B adjacent the lateral side 170B of the frame 105. The temple portions 110A-B may be integrated into the frame 105 on the respective sides 170A-B (as illustrated) or implemented as separate components attached to the frame 105 on the respective sides 170A-B. Alternatively, the temple portions 110A-B may be integrated into the temples 125A-B or other pieces (not shown) attached to the frame 105.

In the example of FIG. 2A, the eye scanner 113 includes an infrared emitter 115 and an infrared camera 120. Visible light cameras typically include a blue light filter to block infrared light detection, in an example, the infrared camera 120 is a visible light camera, such as a low-resolution video graphic array (VGA) camera (e.g., 640×480 pixels for a total of 0.3 megapixels), with the blue filter removed. The infrared emitter 115 and the infrared camera 120 are co-located on the frame 105, for example, both are shown as connected to the upper portion of the rim 107A. The frame 105 or one or more of the temple portions 110A-B include a circuit board (not shown) that includes the infrared emitter 115 and the infrared camera 120. The infrared emitter 115 and the infrared camera 120 can be connected to the circuit board by soldering, for example.

Other arrangements of the infrared emitter 115 and infrared camera 120 can be implemented, including arrangements in which the infrared emitter 115 and infrared camera 120 are both on the rim 107B, or in different locations on the frame 105, for example, the infrared emitter 115 is on the rim 107A and the infrared camera 120 is on the rim 107B. In another example, the infrared emitter 115 is on the frame 105 and the infrared camera 120 is on one of the temple portions 110A-B, or vice versa. The infrared emitter 115 can be connected essentially anywhere on the frame 105, temple portion 110A, or temple portion 110B to emit a pattern of infrared light. Similarly, the infrared camera 120 can be connected essentially anywhere on the frame 105, temple portion 110A, or temple portion 110B to capture at least one reflection variation in the emitted pattern of infrared light.

The infrared emitter 115 and infrared camera 120 are arranged to face inwards towards an eye of the user with a partial or full field of view of the eye in order to identify the respective eye position and gaze direction. For example, the infrared emitter 115 and infrared camera 120 are positioned directly in front of the eye, in the upper part of the frame 105 or in the temple portions 110A-B at either ends of the frame 105.

FIG. 2B is a rear view of an example hardware configuration of another eyewear device 200. In this example configuration, the eyewear device 200 is depicted as including an eye scanner 213 on a temple 210B. As shown, an infrared emitter 215 and an infrared camera 220 are co-located on the temple 210B. It should be understood that the eye scanner 213 or one or more components of the eye scanner 213 can be located on the temple 210A and other locations of the eyewear device 200, for example, the frame 105. The infrared emitter 215 and infrared camera 220 are like that of FIG. 2A, but the eye scanner 213 can be varied to be sensitive to different light wavelengths as described previously in FIG. 2A.

Similar to FIG. 2A, the eyewear device 200 includes a frame 105 which includes a rim 107A which is connected to a rim 107B via a bridge 106; and the rims 107A-B include respective apertures which hold the respective optical elements 180A-B comprising the see-through display 180C-D.

Figure 2C:
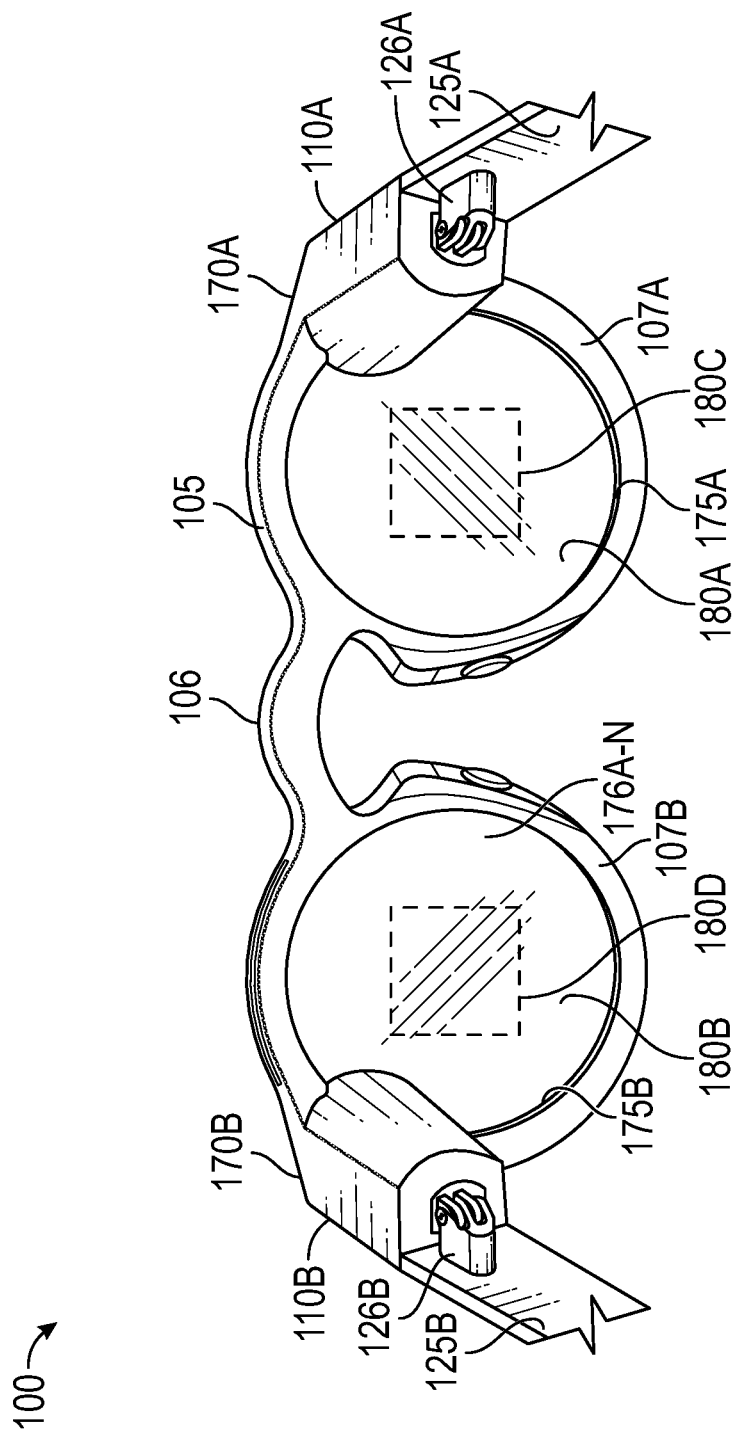
FIGS. 2C and 2D are rear views of example hardware configurations of the eyewear device, including two different types of image displays.
Figure 2D:
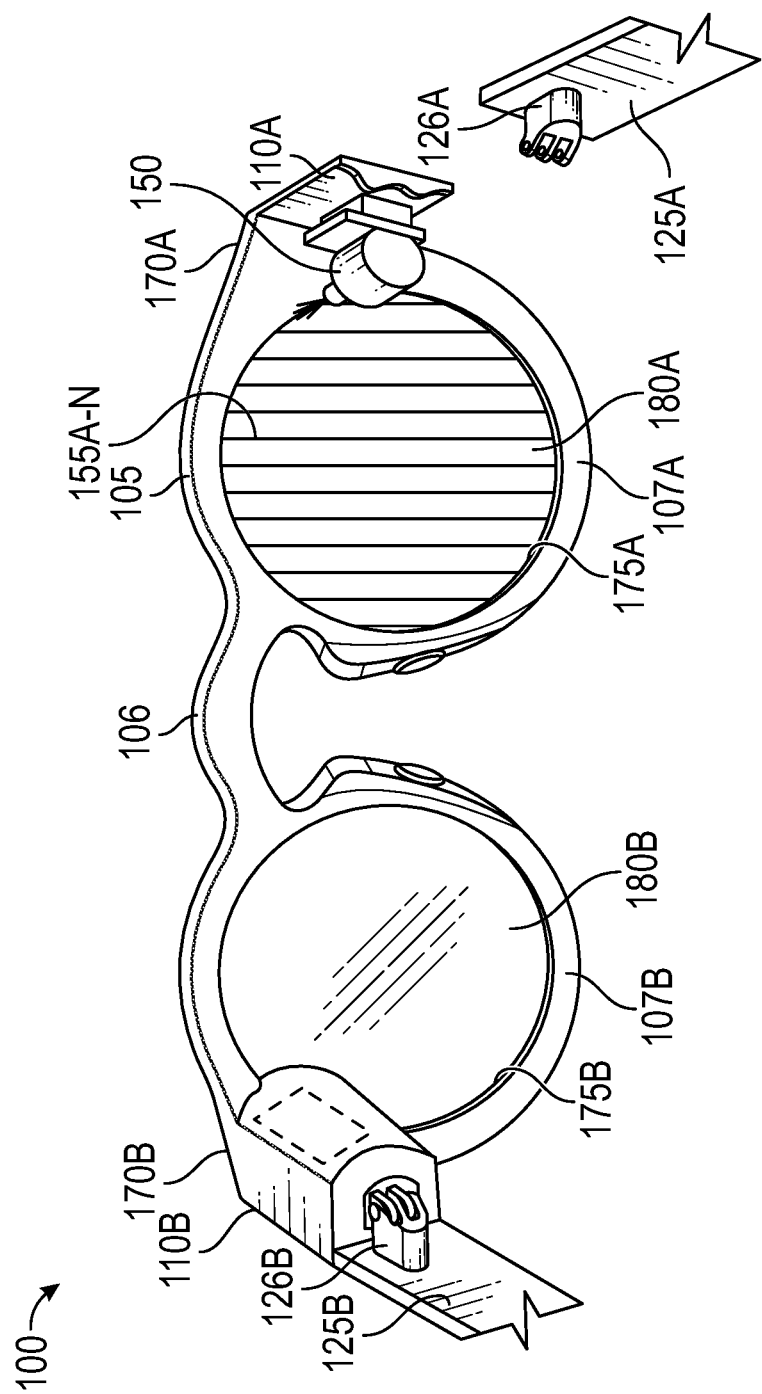

FIGS. 2C-D are rear views of example hardware configurations of the eyewear device 100, including two different types of see-through image displays 180C-D. In one example, these see-through image displays 180C-D of optical assembly 180A-B include an integrated image display.

As shown in FIG. 2C, the optical assemblies 180A-B includes a suitable display matrix 180C-D of any suitable type, such as a liquid crystal display (LCD), an organic light-emitting diode (OLED) display, a waveguide display, or any other such display. The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a surface (e.g., first) for receiving light from display matrix and another surface (e.g., second) for emitting light to the eye of the user. The prism of the optical layers 176A-N extends over all or at least a portion of the respective apertures 175A-B formed in the rims 107A-B to permit the user to see the other surface of the prism when the eye of the user is viewing through the corresponding rim 107A-B. The surface of the prism of the optical layers 176A-N receiving light faces upwardly from the frame 105 and the display matrix overlies the prism so that photons and light emitted by the display matrix impinge the surface. The prism is sized and shaped so that the light is refracted within the prism and is directed towards the eye of the user by the other surface of the prism of the optical layers 176A-N. In this regard, the other surface of the prism of the optical layers 176A-N can be convex to direct the light towards the center of the eye. The prism can optionally be sized and shaped to magnify the image projected by the see-through image displays 180C-D, and the light travels through the prism so that the image viewed from the other surface is larger in one or more dimensions than the image emitted from the see-through image displays 180C-D.

In another example, the see-through image displays 180C-D of optical assembly 180A-B include a projection image display as shown in FIG. 2D. The optical assembly 180A-B includes a laser projector 150, which is a three-color laser projector using a scanning mirror or galvanometer. During operation, an optical source such as a laser projector 150 is disposed in or on one of the temples 125A-B of the eyewear device 100. Optical assembly 180A-B includes one or more optical strips 155A-N spaced apart across the width of the lens of the optical assembly 180A-B or across a depth of the lens between the front surface and the rear surface of the lens.

As the photons projected by the laser projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A-B, the eyewear device 100 can include other arrangements, such as a single or three optical assemblies, or the optical assembly 180A-B may have arranged different arrangement depending on the application or intended user of the eyewear device 100.

As further shown in FIGS. 2C-D, eyewear device 100 includes a temple portion 110A adjacent the lateral side 170A of the frame 105 and a temple portion 110B adjacent the lateral side 170B of the frame 105. The temple portions 110A-B may be integrated into the frame 105 on the respective lateral sides 170A-B (as illustrated) or implemented as separate components attached to the frame 105 on the respective sides 170A-B. Alternatively, the temple portions 110A-B may be integrated into temples 125A-B attached to the frame 105.

In one example, the see-through image displays include the see-through image display 180C and the see-through image display 180D. Eyewear device 100 includes apertures 175A-B, which hold respective optical assemblies 180A-B. The optical assembly 180A includes the see-through image display 180C (e.g., a display matrix of FIG. 2C or optical strips and a projector not shown)). The optical assembly 180B includes the see-through image display 180D (e.g., a display matrix of FIG. 2C (not shown) or optical strips 155A-N and a projector 150)). The successive field of view of the successive displayed image includes an angle of view between about 15° to 30, and more specifically 24°, measured horizontally, vertically, or diagonally. The successive displayed image having the successive field of view represents a combined three-dimensional observable area visible through stitching together of two displayed images presented on the image displays.

As used herein, "an angle of view" describes the angular extent of the field of view associated with the displayed images presented on each of the image displays 180C-D of optical assembly 180A-B. The "angle of coverage" describes the angle range that a lens of visible light cameras 114A-B or infrared camera 220 can image. Typically, the image circle produced by a lens is large enough to cover the film or sensor completely, possibly including some vignetting (i.e., a reduction of an image's brightness or saturation toward the periphery compared to the image center). If the angle of coverage of the lens does not fill the sensor, the image circle will be visible, typically with strong vignetting toward the edge, and the effective angle of view will be limited to the angle of coverage. The "field of view" is intended to describe the field of observable area which the user of the eyewear device 100 can see through his or her eyes via the displayed images presented on the image displays 180C-D of the optical assembly 180A-B. Image display 180C of optical assembly 180A-B can have a field of view with an angle of coverage between 15° to 30°, for example 24°, and have a resolution of 480×480 pixels.

Figure 3:
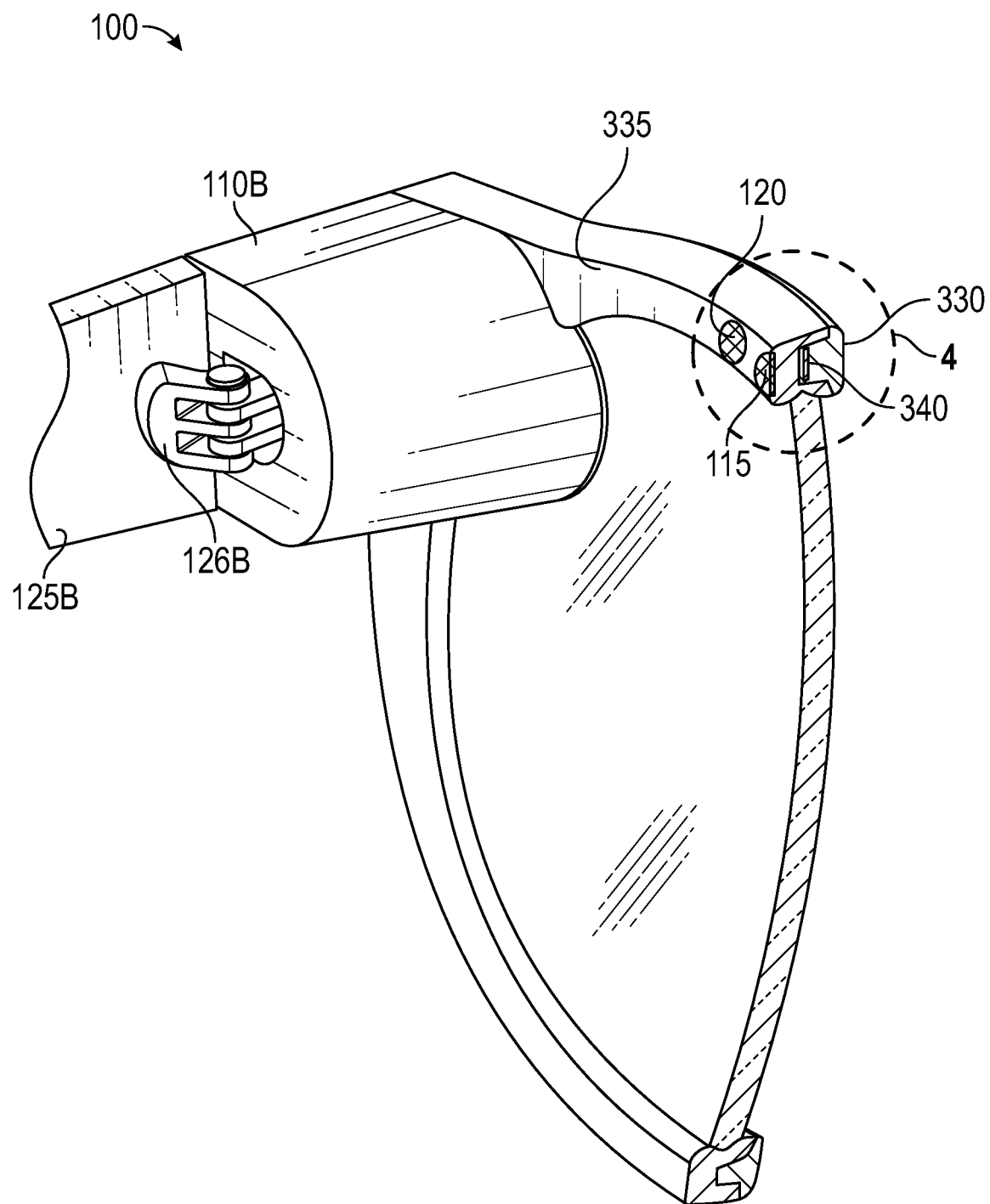
FIG. 3 shows a rear perspective view of the eyewear device of FIG. 2A depicting an infrared emitter, an infrared camera, a frame front, a frame back, and a circuit board.

FIG. 3 shows a rear perspective view of the eyewear device of FIG. 2A. The eyewear device 100 includes an infrared emitter 215, infrared camera 220, a frame front 330, a frame back 335, and a circuit board 340. It can be seen in FIG. 3 that the upper portion of the rim of the frame of the eyewear device 100 includes the frame front 330 and the frame back 335. An opening for the infrared emitter 215 is formed on the frame back 335.

As shown in the encircled cross-section 4 in the upper middle portion of the rim of the frame, a circuit board, which is a flexible PCB 340, is sandwiched between the frame front 330 and the frame back 335. Also shown in further detail is the attachment of the temple portion 110A to the temple 125A via the hinge 126A. In some examples, components of the eye movement tracker 213, including the infrared emitter 215, the flexible PCB 340, or other electrical connectors or contacts may be located on the temple 125A or the hinge 126A.

Figure 4:
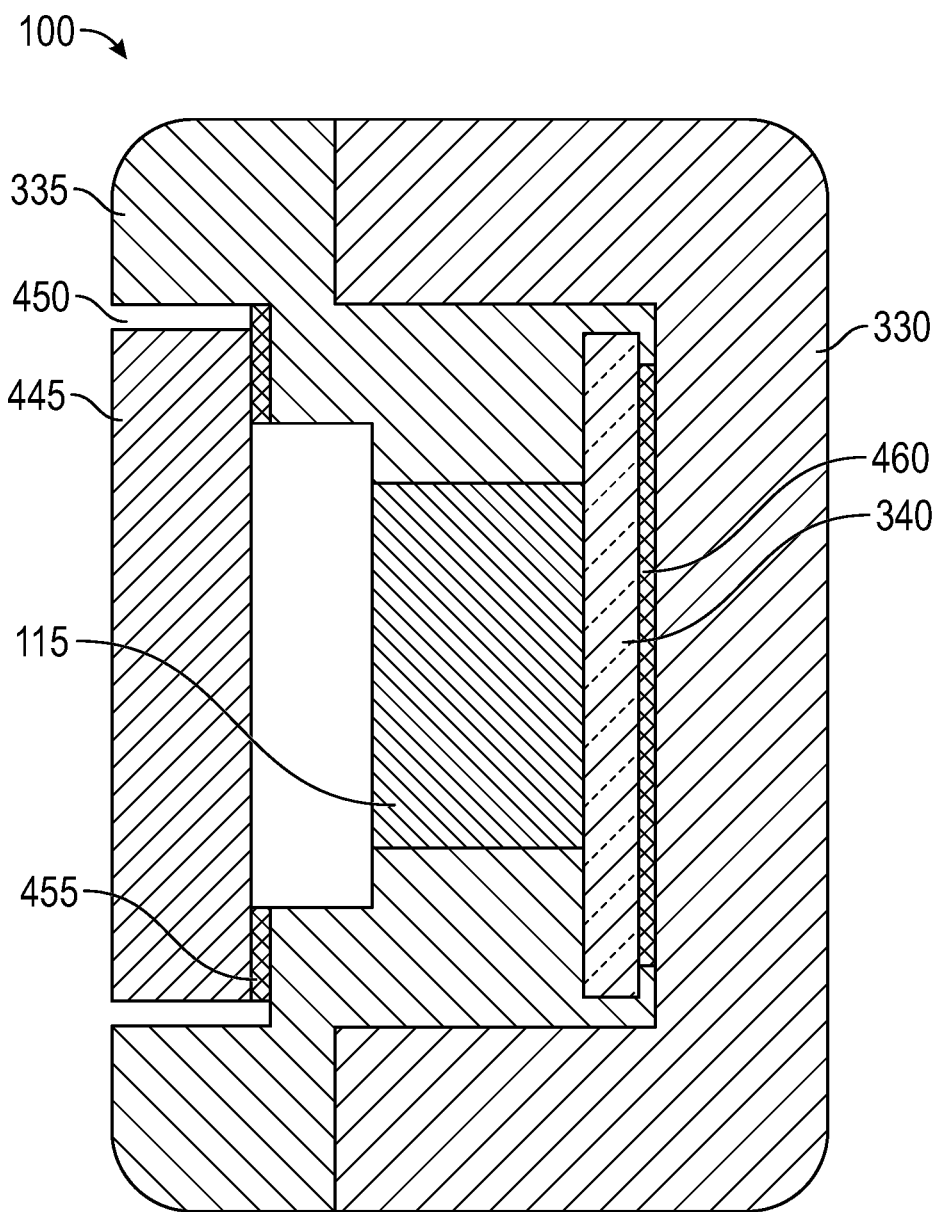
FIG. 4 is a cross-sectional view taken through the infrared emitter and the frame of the eyewear device of FIG. 3.

FIG. 4 is a cross-sectional view through the infrared emitter 215 and the frame corresponding to the encircled cross-section 4 of the eyewear device of FIG. 3. Multiple layers of the eyewear device 100 are illustrated in the cross-section of FIG. 4, as shown the frame includes the frame front 330 and the frame back 335. The flexible PCB 340 is disposed on the frame front 330 and connected to the frame back 335. The infrared emitter 215 is disposed on the flexible PCB 340 and covered by an infrared emitter cover lens 445. For example, the infrared emitter 215 is reflowed to the back of the flexible PCB 340. Reflowing attaches the infrared emitter 215 to contact pad(s) formed on the back of the flexible PCB 340 by subjecting the flexible PCB 340 to controlled heat which melts a solder paste to connect the two components. In one example, reflowing is used to surface mount the infrared emitter 215 on the flexible PCB 340 and electrically connect the two components. However, it should be understood that through-holes can be used to connect leads from the infrared emitter 215 to the flexible PCB 340 via interconnects, for example.

The frame back 335 includes an infrared emitter opening 450 for the infrared emitter cover lens 445. The infrared emitter opening 450 is formed on a rear-facing side of the frame back 335 that is configured to face inwards towards the eye of the user. In the example, the flexible PCB 340 can be connected to the frame front 330 via the flexible PCB adhesive 460. The infrared emitter cover lens 445 can be connected to the frame back 335 via infrared emitter cover lens adhesive 455. The coupling can also be indirect via intervening components.

Figure 5:
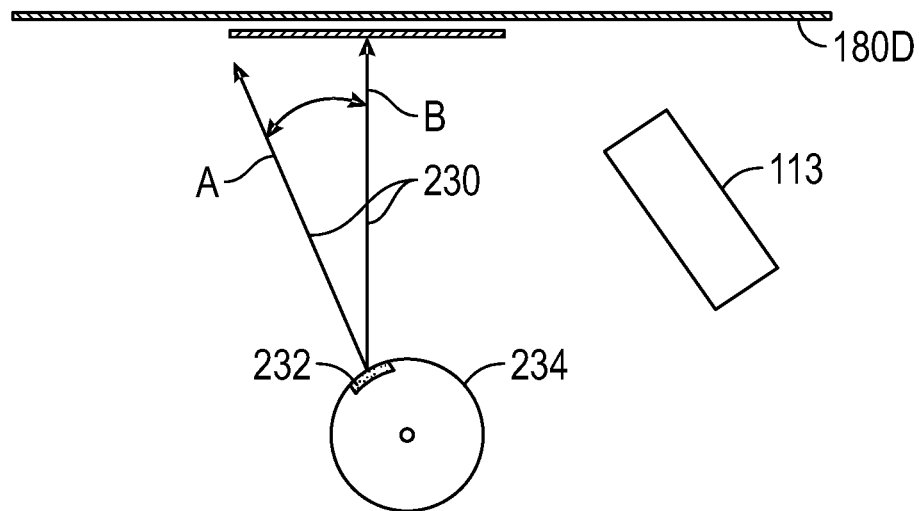
FIG. 5 is an illustration depicting detection of eye gaze direction.
Figure 6:
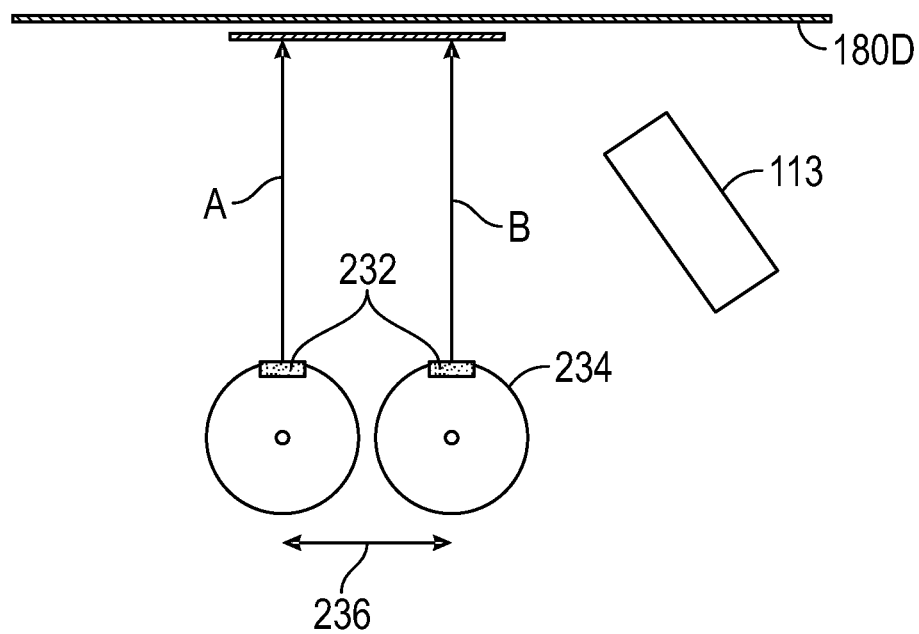
FIG. 6 is an illustration depicting detection of eye position.

In an example, the processor 932 utilizes eye tracker 213 to determine an eye gaze direction 230 of a wearer's eye 234 as shown in FIG. 5, and an eye position 236 of the wearer's eye 234 within an eyebox as shown in FIG. 6. The eye tracker 213 is a scanner which uses infrared light illumination (e.g., near-infrared, short-wavelength infrared, mid-wavelength infrared, long-wavelength infrared, or far infrared) to captured image of reflection variations of infrared light from the eye 234 to determine the gaze direction 230 of a pupil 232 of the eye 234, and also the eye position 236 with respect to the see-through display 180D.

Figure 7:
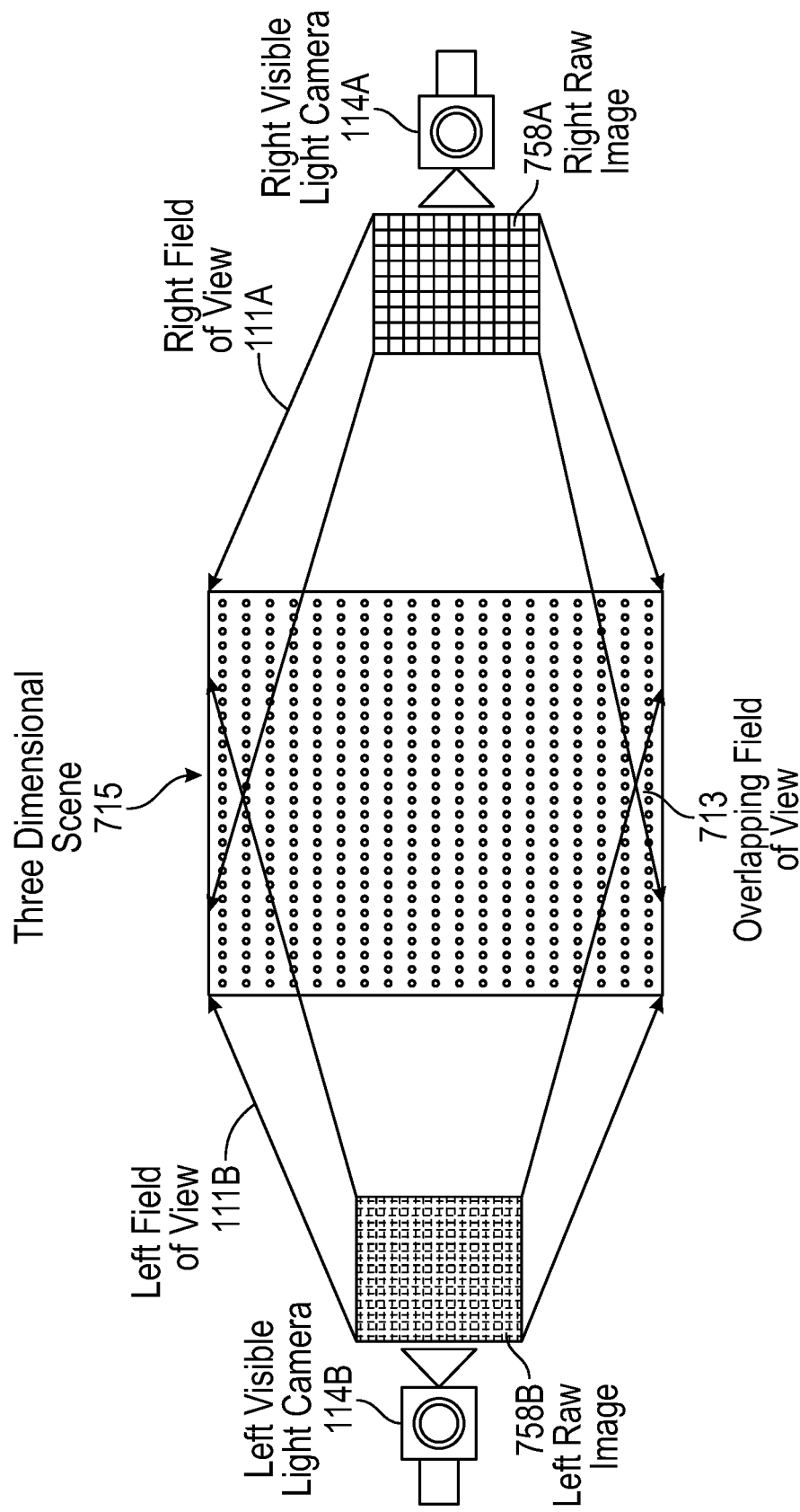
FIG. 7 is an illustration depicting an example of visible light captured by the visible light cameras as raw images.

FIG. 7 depicts an example of capturing visible light with cameras. Visible light is captured by the visible light camera 114A with a visible light camera field of view 111A as a raw image 758A. Visible light is captured by the visible light camera 114B with a visible light camera field of view 111B (having an overlap 713 with the field of view 111A) as a raw image 758B. Based on processing of the raw image 758A and the raw image 758B, a three-dimensional depth map 715 of a three-dimensional scene, referred to hereafter as an image, is generated by processor 932.

Figure 8A:
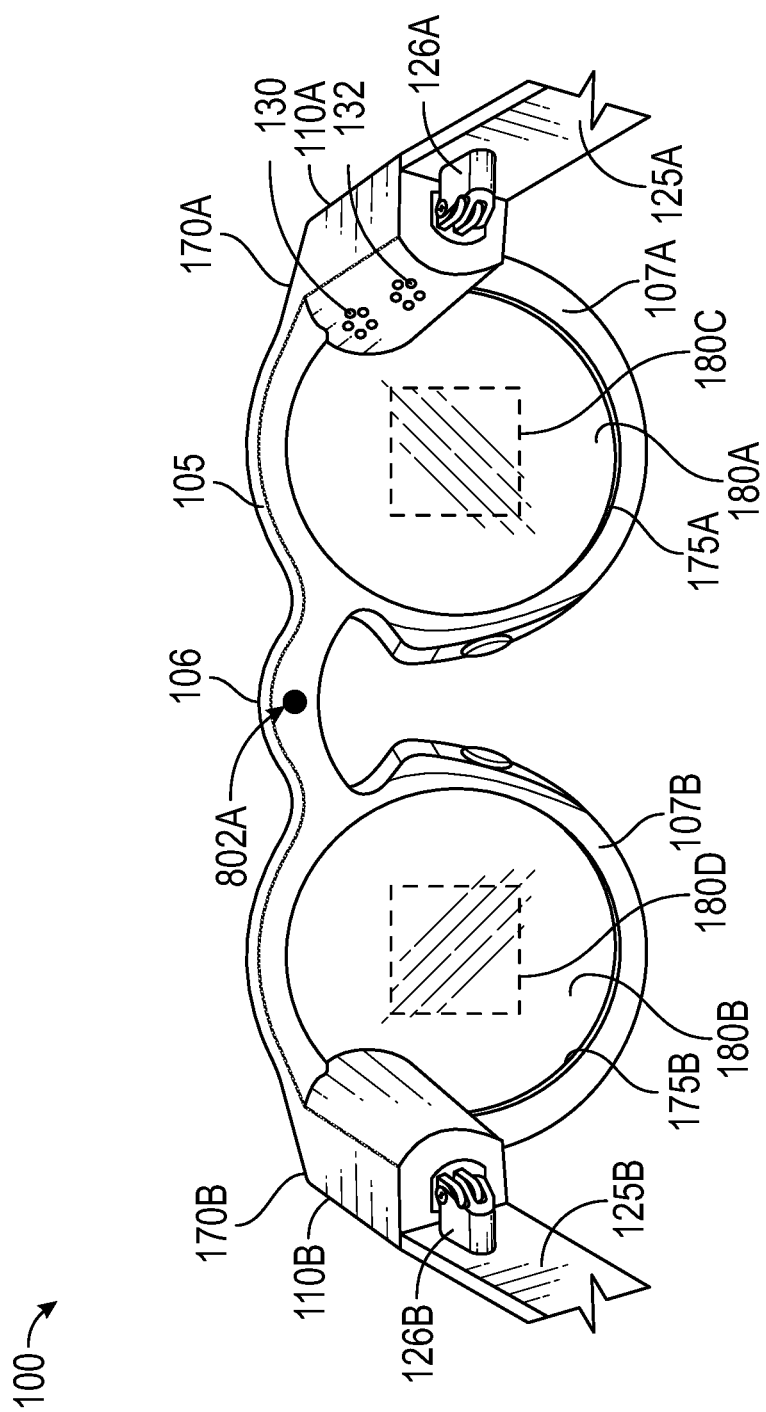
FIG. 8A is a rear view of an example eyewear device depicting a strain gauge sensor on a bridge of the frame.

FIG. 8A depicts a rear view of an example hardware configuration of eyewear device 100 including a strain gauge sensor 802A located on the bridge 106 of the frame 105. The strain gauge sensor 802A measures the force being applied by a head of the user to the eyewear device 100 by measuring a deformation of the frame 105. The processor 932 receives signals from the strain gauge 802A and determines when a signature event(s) takes place (see FIG. 10). The sampling rate of the strain gauge 802A is selected by the processor 932 to meet the sensitivity and power requirements of the eyewear device 100. For example, when the eyewear device 100 is in a sleep mode where the eyewear device 100 is not being worn and the displays 180C-D are powered off, the sampling rate is set to a lower rate, such as 20 Hz, to reduce power consumption. When the eyewear device 100 is powered on and being used by a user, the processor sampling rate of the strain gauge 802A is set to a higher sampling rate, such as 50 Hz to improve performance and reduce the effects of perceived noise of the strain gauge sensor 802A. Other sampling rates may be used to improve performance of the sensor for various applications. In another example, the strain gauge 802A senses strain at the lower sampling rate when the processor 932 is in the sleep mode, and at the higher sampling rate when the processor 932 is powered on.

Figure 8B:
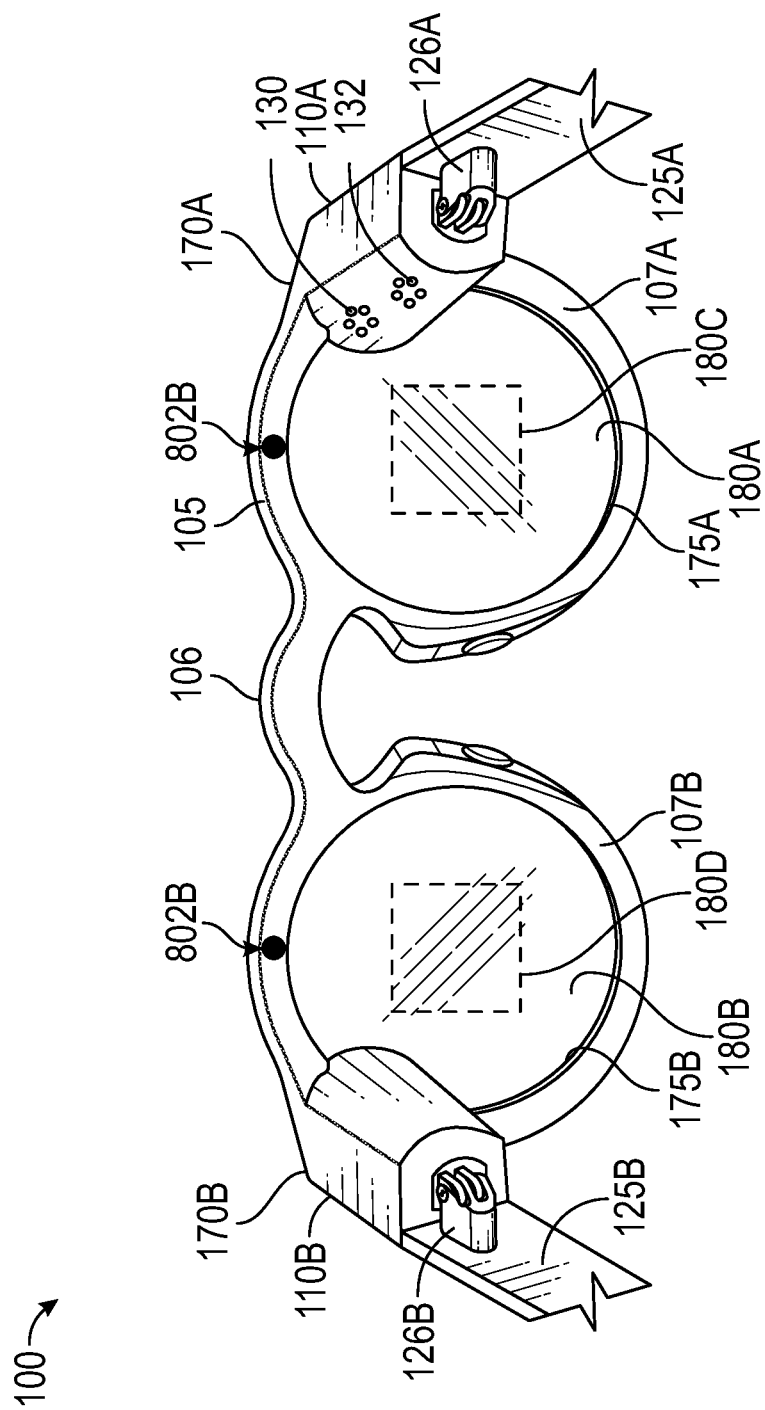
FIG. 8B is a rear view of an example eyewear device depicting the strain gauge sensor on the frame above the optical assembly.

FIG. 8B depicts a perspective rear view of an example hardware configuration of eyewear device 100 wherein a respective strain gauge 802B is located on the frame 105 above each optical assembly 180A-B.

Figure 8C:
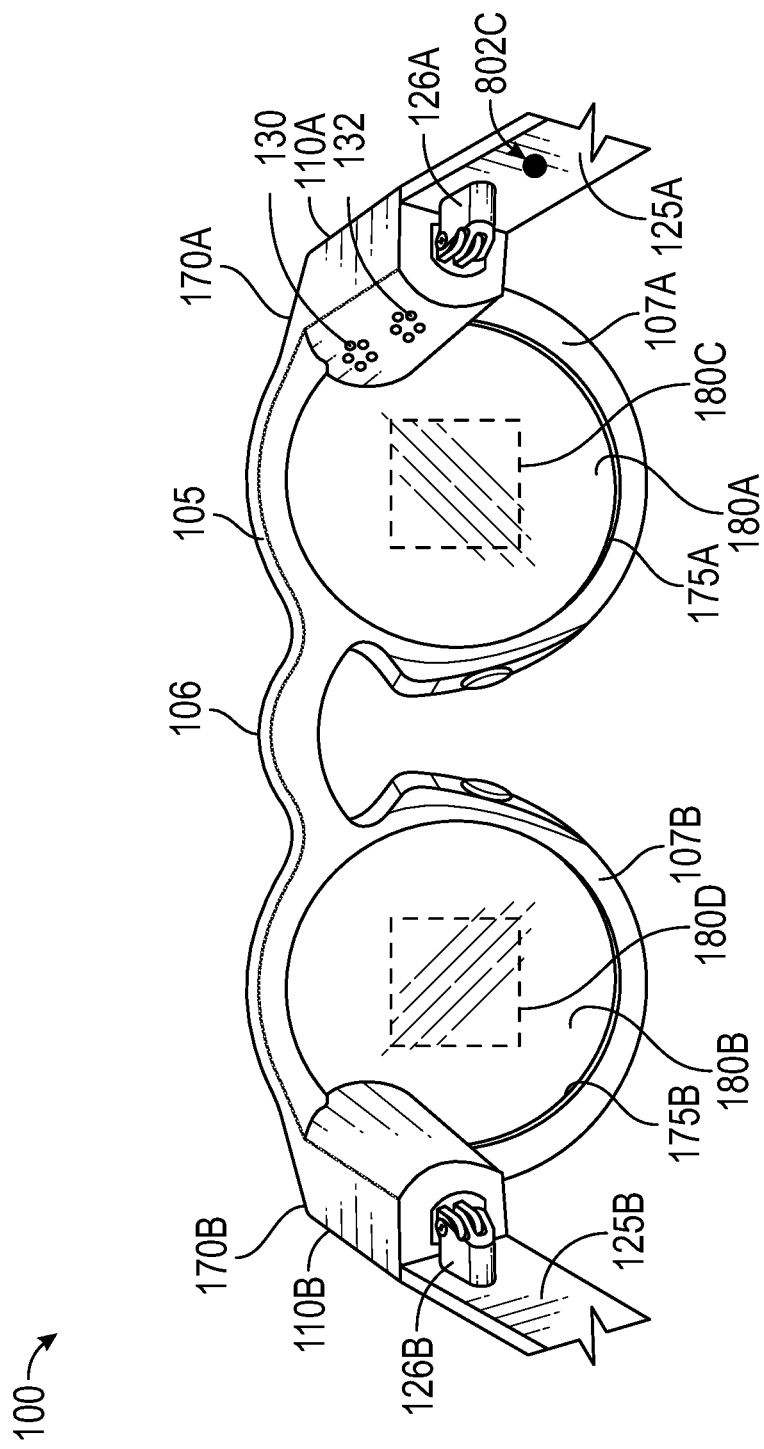
FIG. 8C is a rear view of an example eyewear device depicting the strain gauge sensor on a temple.

FIG. 8C depicts a perspective rear view of an example hardware configuration of eyewear device 100 wherein a strain gauge 802C is located in the temple 125A.

The temperature of the strain gauge sensor 802A-C may affect the accuracy of measurements generated by the strain gauge sensor 802A-C. In one example, the strain gauge sensors 802A-C are placed in locations on the eyewear device 100 where temperature fluctuations caused by the electronic components, and the user, are nominal such as remote from processor 932, to provide consistent sensor measurements. In another example of the eyewear device 100, strain gauge sensors 802A-C are placed in proximity to heat producing electronic components. A temperature sensor 804, such as a thermocouple, is placed in proximity of the strain gauge sensor 802A-C so the processor 932 can calibrate the strain gauge sensor 802A-C measurements according to the measured temperature proximate the strain gauge sensor 802A-C. An example of a strain gauge sensor 802A-C is a linear strain gauge sensor such as an SGD-7/1000-LY13 linear strain gauge sensor available from Omega Engineering Inc. in Norwalk, CT.

The processor 932 uses measurements from the strain gauge sensor 802A-C to determine, for example, a head size of a user wearing the eyewear device 100. The processor 932 uses the measurements of the strain gauge sensor 802A-C when the user is wearing the eyewear device 100 and compares the measurements to a head size database 970 stored in the memory 934 of the eyewear device 100 in one example. In another example, the head size database 970 is stored remotely from the eyewear device 100 and is accessed via the network 995. The measurement of a user's head size, such as head breadth, can be used to identify a particular user or a particular type of user when multiple users share a single eyewear device 100.

In an example, if the sensor measurements indicate a 1 degree bend in the eyewear device 100 proximate the strain gauge sensor 802A-C, the processor 932 detects an adult is wearing the eyewear device 100. If the sensor measurements indicate a 0.5 degree bend in the eyewear device 100 proximate the strain gauge sensor 802A-C, the processor 932 detects that a child is wearing the eyewear device 100. The processor 932 can operate the eyewear device 100 differently as a function of the determined attribute of the user, such as an adult or child, or a parent and child in a family. In an example, if a child is determined by the processor 932 to be using the eyewear device 100, features of the eyewear device 100 can be customized, or content limited such as restriction from accessing adult material.

Figure 9:
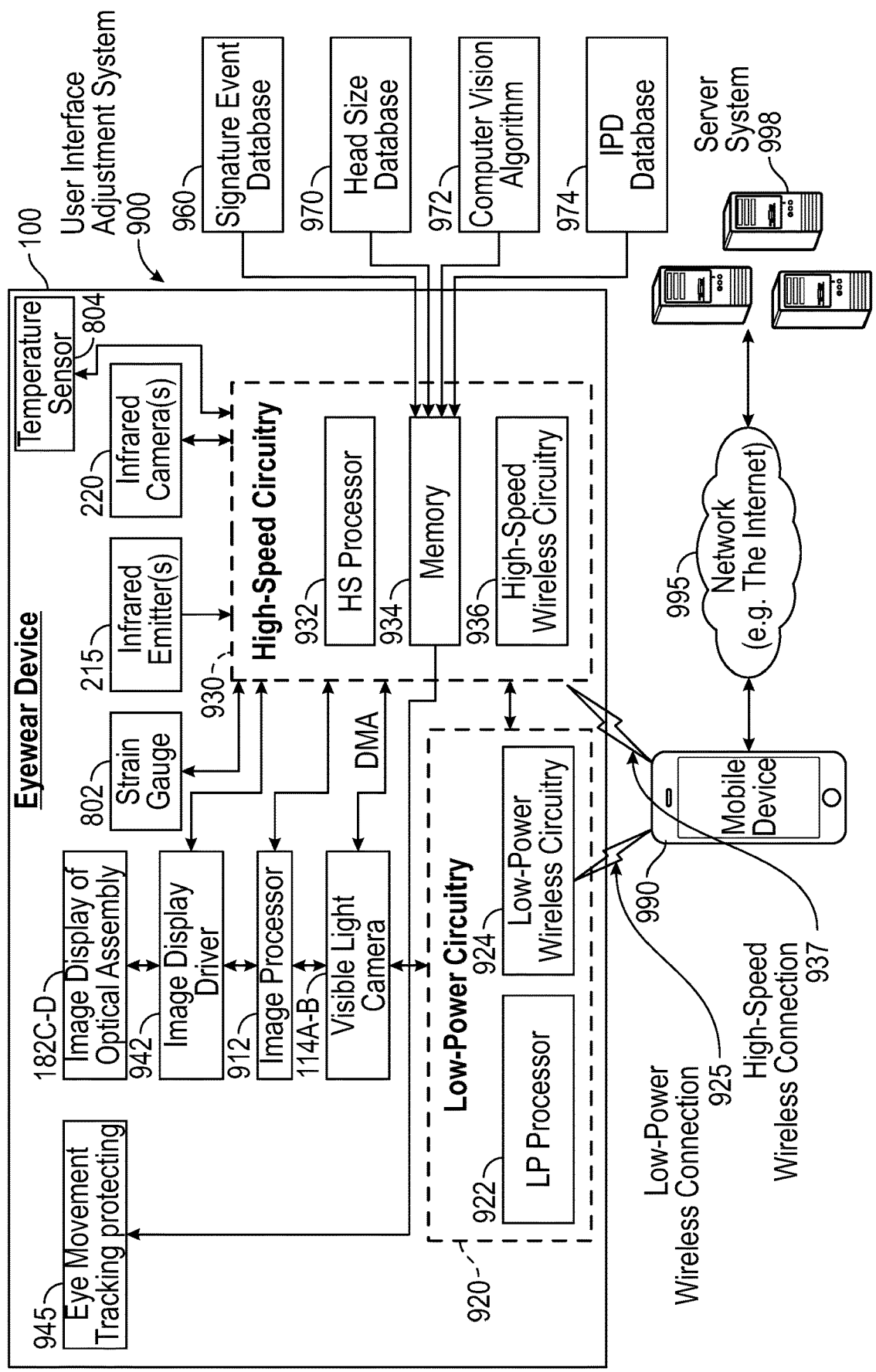
FIG. 9 is a block diagram of electronic components of the eyewear device.

FIG. 9 depicts a high-level functional block diagram including example electronic components disposed in the eyewear device 100/200. The illustrated electronic components include the processor 932, the memory 934, and the see-through image display 180C and 180D including embedded antennas.

Memory 934 includes instructions including computer readable code for execution by processor 932 to implement functionality of eyewear device 100/200, including instructions (code) for processor 932 to control in the image 715. Processor 932 receives power from battery (not shown) and executes the instructions stored in memory 934, or integrated with the processor 932 on-chip, to perform functionality of eyewear device 100/200, and communicating with external devices via wireless connections.

A user interface adjustment system 900 includes a wearable device, which is the eyewear device 100 with an eye movement tracker 213 (e.g., shown as infrared emitter 215 and infrared camera 220 in FIG. 2B). User interface adjustments system 900 also includes a mobile device 990 and a server system 998 connected via various networks. Mobile device 990 may be a smartphone, tablet, laptop computer, access point, or any other such device capable of connecting with eyewear device 100 using both a low-power wireless connection 925 and a high-speed wireless connection 937. Mobile device 990 is connected to server system 998 and network 995. The network 995 may include any combination of wired and wireless connections.

Eyewear device 100 includes at least two visible light cameras 114A-B (e.g., one associated with each lateral side 170A-B). Eyewear device 100 further includes see-through image displays 180C-D of the optical assembly 180A-B (e.g., one associated with each lateral side 170A-B). The image displays 180C-D are optional in this disclosure. Eyewear device 100 also includes image display driver 942, image processor 912, low-power circuitry 920, and high-speed circuitry 930. The components shown in FIG. 9 for the eyewear device 100 are located on one or more circuit boards, for example a PCB or flexible PCB, in the temples. Alternatively, or additionally, the depicted components can be located in the temples, frames, hinges, or bridge of the eyewear device 100. The visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Eye movement tracking programming 945 implements the user interface field of view adjustment instructions, including, to cause the eyewear device 100 to track, via the eye movement tracker 213, the eye movement of the eye of the user of the eyewear device 100. Other implemented instructions (functions) cause the eyewear device 100 to determine, a field of view adjustment to the initial field of view of an initial displayed image based on the detected eye movement of the user corresponding to a successive eye direction. Further implemented instructions generate a successive displayed image of the sequence of displayed images based on the field of view adjustment. The successive displayed image is produced as visible output to the user via the user interface. This visible output appears on the see-through image displays 180C-D of optical assembly 180A-B, which is driven by image display driver 942 to present the sequence of displayed images, including the initial displayed image with the initial field of view and the successive displayed image with the successive field of view.

As shown in FIG. 9, high-speed circuitry 930 includes high-speed processor 932, memory 934, and high-speed wireless circuitry 936. In the example, the image display driver 942 is coupled to the high-speed circuitry 930 and operated by the high-speed processor 932 in order to drive the image displays 180C-D of the optical assembly 180A-B. High-speed processor 932 may be any processor capable of managing high-speed communications and operation of any general computing system needed for eyewear device 100. High-speed processor 932 includes processing resources needed for managing high-speed data transfers on high-speed wireless connection 937 to a wireless local area network (WLAN) using high-speed wireless circuitry 936.

In certain examples, the high-speed processor 932 executes an operating system such as a LINUX operating system or other such operating system of the eyewear device 100 and the operating system is stored in memory 934 for execution. In addition to any other responsibilities, the high-speed processor 932 executing a software architecture for the eyewear device 100 is used to manage data transfers with high-speed wireless circuitry 936. In certain examples, high-speed wireless circuitry 936 is configured to implement Institute of Electrical and Electronic Engineers (IEEE) 802.11 communication standards, also referred to herein as Wi-Fi. In other examples, other high-speed communications standards may be implemented by high-speed wireless circuitry 936.

Low-power wireless circuitry 924 and the high-speed wireless circuitry 936 of the eyewear device 100 can include short range transceivers (Bluetooth™) and wireless wide, local, or wide area network transceivers (e.g., cellular or WiFi). Mobile device 990, including the transceivers communicating via the low-power wireless connection 925 and high-speed wireless connection 937, may be implemented using details of the architecture of the eyewear device 100, as can other elements of network 995.

Memory 934 includes any storage device capable of storing various data and applications, including, among other things, color maps, camera data generated by the visible light cameras 114A-B and the image processor 912, as well as images generated for display by the image display driver 942 on the see-through image displays 180C-D of the optical assembly 180A-B. While memory 934 is shown as integrated with high-speed circuitry 930, in other examples, memory 934 may be an independent standalone element of the eyewear device 100. In certain such examples, electrical routing lines may provide a connection through a chip that includes the high-speed processor 932 from the image processor 912 or low-power processor 922 to the memory 934. In other examples, the high-speed processor 932 may manage addressing of memory 934 such that the low-power processor 922 will boot the high-speed processor 932 any time that a read or write operation involving memory 934 is needed.

Server system 998 may be one or more computing devices as part of a service or network computing system, for example, that include a processor, a memory, and network communication interface to communicate over the network 995 with the eyewear device 100 via high-speed wireless circuitry 936, either directly, or via the mobile device 990. Eyewear device 100 is connected with a host computer. In one example, the eyewear device 100 wirelessly communicates with the network 995 directly, without using the mobile device 990, such as using a cellular network or WiFi. In another example, the eyewear device 100 is paired with the mobile device 990 via the high-speed wireless connection 937 and connected to the server system 998 via the network 995.

Output components of the eyewear device 100 include visual components, such as the image displays 180C-D of optical assembly 180A-B as described in FIGS. 2C-D (e.g., a display such as a liquid crystal display (LCD), a plasma display panel (PDP), a light emitting diode (LED) display, a projector, or a waveguide). The image displays 180C-D of the optical assembly 180A-B are driven by the image display driver 942. The output components of the eyewear device 100 further include acoustic components (e.g., speakers), haptic components (e.g., a vibratory motor), other signal generators, and so forth. The input components of the eyewear device 100, the mobile device 990, and server system 998, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Eyewear device 100 may optionally include additional peripheral device elements. Such peripheral device elements may include biometric sensors, additional sensors, or display elements integrated with eyewear device 100. For example, peripheral device elements may include any I/O components including output components, motion components, position components, or any other such elements described herein.

For example, the biometric components of the user interface field of view adjustment may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 925 and 937 from the mobile device 990 via the low-power wireless circuitry 924 or high-speed wireless circuitry 936.

According to some examples, an "application" or "applications" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or other mobile operating systems. In this example, the third-party application can invoke API calls provided by the operating system to facilitate functionality described herein.

Figure 10:
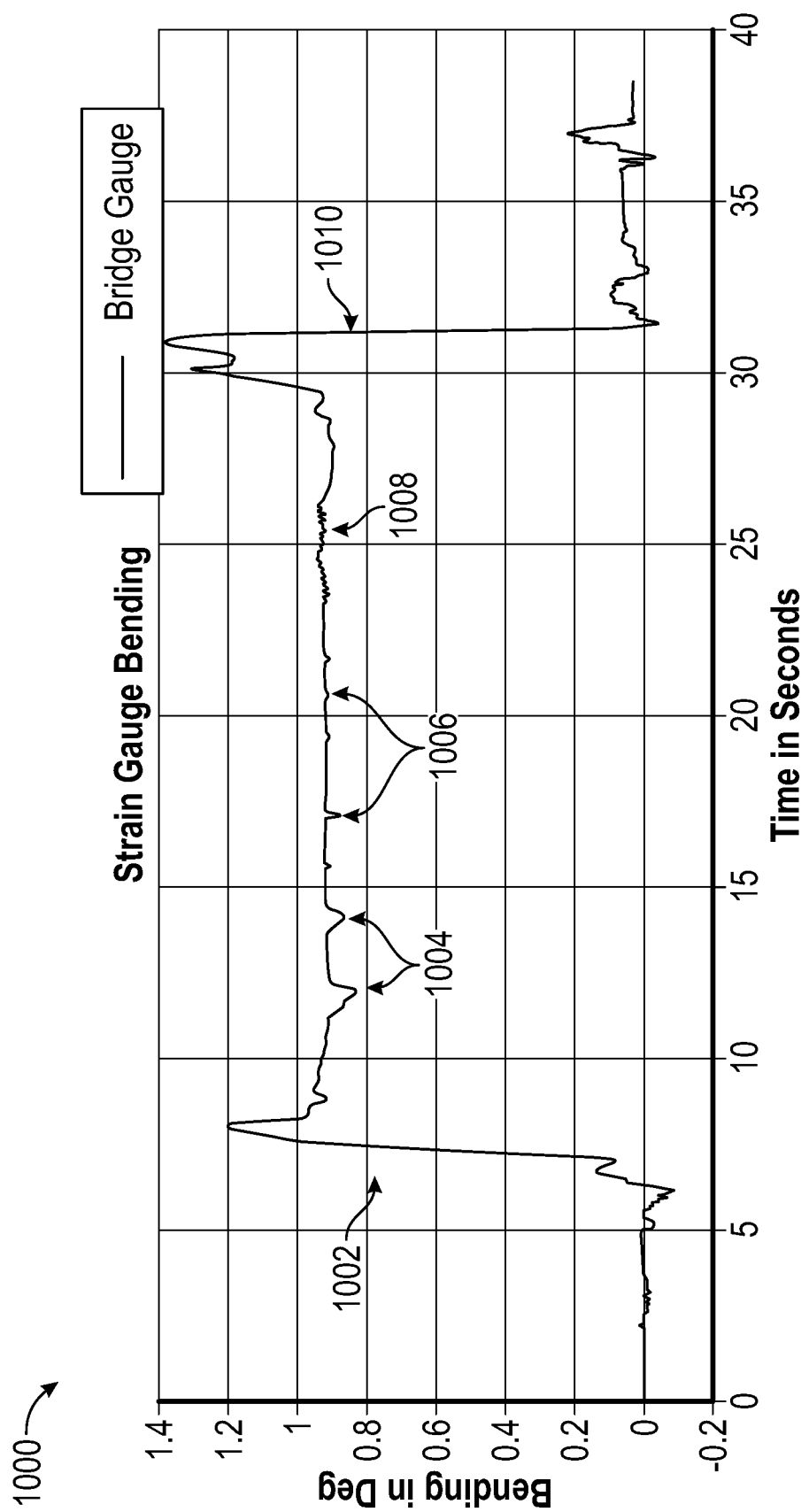
FIG. 10 is a waveform of the strain gauge sensor data for signature events.

FIG. 10 is a waveform 1000 of the measurements of strain gauge sensor 802A located in the bridge 106 of the eyewear device 100 as shown in FIG. 8A for a variety of signature events. The waveform 1000 shows several signature events including event 1002 when the user places the eyewear device 100 on the user's head, event 1004 when the user presses buttons on the eyewear device 100, event 1006 when the user taps the eyewear device 100, event 1008 when the user head is rotated, and event 1010 when the user takes the eyewear device 100 off of the user's head. The waveform 1000 additionally shows when the device 100 is being worn by the user such as between signature events 1002 and 1010. This is seen as an increased baseline measurement between the 10 and 30 second marks as compared to the 0-5 and 32-37 second marks. The processor 932 identifies the signature events from measurement signals generated by the strain gauge sensor 802A. In one example, a signature event database 960 is stored in the memory 934 and the processor 932 compares strain gauge sensor 802A-C measurements to the signature event database 960 to determine the occurrence of a signature event. In another example, the signature event database 960 is stored remotely from the eyewear device 100 and is accessed via the network 995.

The identification of specific signature events can be used to trigger certain functionalities of the eyewear device 100. For example, the signature event 1002 of putting on the eyewear device 100 results in the processor 932 turning the display 180C-D of the eyewear device 100 on, and the signature event 1010 of taking off the eyewear device 100 results in the processor 932 turning off the display 180C-D. Other functionalities that may be controlled by signature events include the processor 932 playing and pausing music, the processor 932 altering a social status such as online and offline, and increasing and reducing processor 932 power consumption such as by controlling the sample rate.

The signature event 1002 of the user placing the eyewear device 100 on the user's head is about 2-3 seconds long. The processor 932 recognizes the beginning of signature event 1002 to power on the eyewear device 100 and the displays 180C-D while the user is putting on the eyewear device 100. This provides for a smooth user experience of powering on the eyewear device 100 while the user is putting on the eyewear device 100.

The head movement tracker 109 may be utilized by the processor 932 to filter out false signature events measured by the strain gauge sensor 802A-C. For example, if a user using the eyewear device 100 moves in a particular way, such as jumping, the strain gauge sensor 802A-C may produce a reading that resembles a signature event, such as taking the eyewear device 100 off the user's head. The processor 932 uses measurements from the accelerometer of the head movement tracker 109 to verify the occurrence of signature events.

Figure 11:
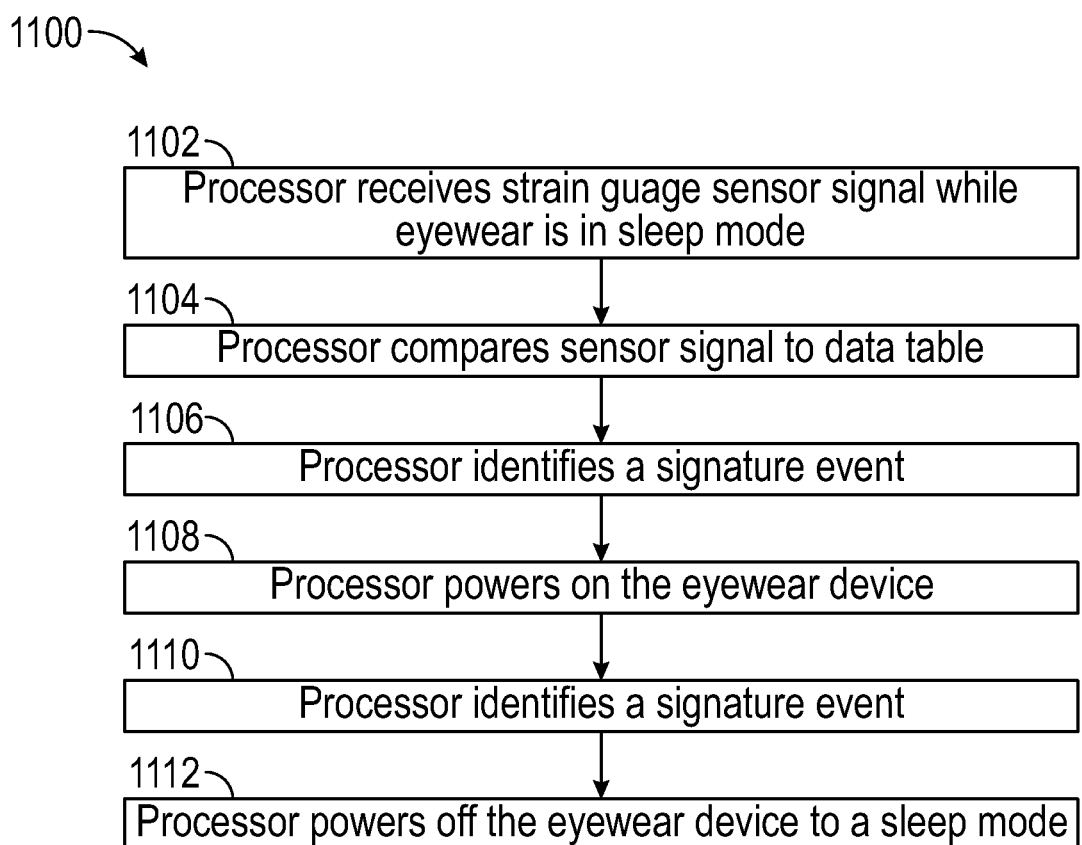
FIG. 11 is a method of using the strain gauge sensor to control the eyewear device.

FIG. 11 is a flowchart 1100 of a method of powering the eyewear device 100 on and off as a function of the strain gauge sensor 802A-C measurements.

At block 1102, the processor 932 uses the strain gauge sensor 802A-C to take strain measurements of the eyewear device 100 while the eyewear device 100 is in a sleep mode, wherein the displays 180C-D are powered off and the eyewear device 100 has minimal power consumption. The sampling rate of the strain gauge 802A is selected by the processor 932 to meet the sensitivity and power requirements of the eyewear device 100. The obtained strain measurements are shown as waveform 1000 in FIG. 10. The processor 932 takes the strain measurements at a lower sampling rate, such as 20 Hz, to reduce power consumption.

At block 1104, the processor 932 compares the strain gauge measurements to the signature event database 960 at the lower sampling rate. In one example, the signature event database 960 is stored in the memory 934 and the processor 932 performs signal processing by comparing the strain gauge measurements to the signature event database 960 to determine the occurrence of a signature event. In another example, the signature event database 960 is stored remotely from the eyewear device 100 and is accessed by the processor 932 via the network 995.

At block 1106, the processor 932 identifies a signature event by performing signal processing of the measurements generated by the strain gauge 802A-C. This is done by the processor 932 comparing the strain gauge measurements to the signature event database 960 to identify a match, such as signature events 1002, 1004, 1006, 1008 and 1010 shown in FIG. 10. The identification of specific signature events is used to trigger certain functionalities of the eyewear device 100. In one example shown in FIG. 10, the processor 932 detects a strain gauge measurement that is substantially constant for a period time (e.g., has been given time to settle) and then identifies a signature event, such as signature event 1002, by comparing the detected potential signature event to signature events in the signature event database to identify a match. In another example, the processor 932 detects strain gauge measurements that vary over time to detect a waveform signature, such as during a time segment corresponding to signature events 1004, 1006 and 1008.

At block 1108, the processor 932 determines that the signature event 1002 correlates to the eyewear device 100 being put on a user's head, and powers on the eyewear device 100. Powering on the eyewear device 100 includes activating the displays 180C-D and operating the processor 932 in a normal use mode. In the normal use mode, the processor samples the strain gauge sensor at an increased sampling rate, e.g., 60 cycles per second or greater.

At block 1110, the processor 932 identifies another signature event by processing the measurements from the strain gauge sensor 802A-C, including comparing the sensed measurements to the signature event database 960. The additional signature events include event 1004 when the user presses buttons on the eyewear device 100, event 1006 when the user taps the eyewear device 100, event 1008 when the user head is rotated, and event 1010 when the user takes the eyewear device 100 off of the user's head.

At block 1112, in an example, the processor 932 determines that the signature event 1010 correlates to the eyewear device 100 being taken off a user's head, and then places the eyewear device 100 in a sleep mode. The sleep mode includes the processor 932 turning off the displays 180C-D, and the processor 932 operating in a power conserving mode at a reduced sampling rate.

Other signature events can be detected as described, such as detecting a user pushing a button, tapping the eyewear device 100 such as a display or control input, or rotation of the user's head; and other actions can be taken by the processor 932 in response to the detected signature events as described.

The IPD of a user wearing the eyewear device 100 is estimated by the processor 932 to control imaging and other eyewear functions, such as to improve virtual object rendering for an improved AR viewing experience while reducing VAM. Users have a head breadth (HB), where users with a larger HB tend to have a larger IPD. Larger HBs cause the temples 125A and 125B of the eyewear device 100 to bend outwardly, and in turn bend and spatially deform the eyewear frame 105. The processor 932 determines the HB based on the determined frame bend, and then determines the IPD based on the HB.

Figure 12A:
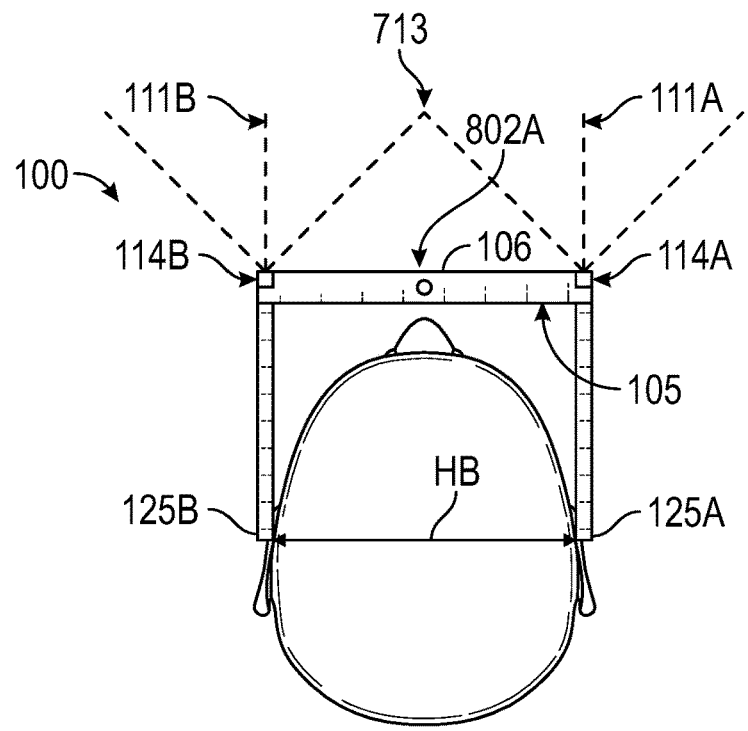
FIG. 12A is a top view of an example eyewear device depicting an absence of deformation of a frame when worn on a user's head.

FIG. 12A depicts a top view of an example hardware configuration of eyewear device 100 including the strain gauge sensor 802A located on bridge 106 of frame 105. Eyewear device 100 is shown being worn by a user having a HB where the temples 125A and 125B contact the user's head, where the HB does not result in bending or spatial deformation of the frame 105, collectively referred to as deformation. The spacing between extended temples 125A and 125B is set during manufacture at a predetermined temple width, for example, 145 mm. In the example of FIG. 12A, the predetermined temple width and the HB are the same, 145 mm. When the HB is less than the predetermined temple width there is no frame bending or spatial deformation. The frontward facing field of view (FOV) 111A and 111B of the visible light cameras 114A and 114B, respectively, are in an original orientation with respect to one another that is set during manufacture. As described with reference to FIG. 7, the visible light cameras 114A and 114B produce raw images 758A and 758B that overlap at 713, where a baseline overlap 713 is defined during manufacture.

The processor 932 first determines the HB, based on the sensor measurement of the strain gauge sensor 802A or by a calculation made by a computer vision (CV) algorithm 972, using a head size database 970 including data correlating frame bending to HB, and then IPD using an IPD database 974 including data correlating HB to IPD. In the example shown in FIG. 12A where frame 105 is not bent or spatially deformed due to the user HB being at or less than the predetermined temple width, such as 145 mm, the IPD is set to correlate to a nominal IPD, such as 61 mm. If user demographics are entered into eyewear device 100, such a user's age and gender, the IPD may be updated to match statistical data in IPD database 974 based on the user's demographics. In an example, users in the age range of 40-55 may have a larger HB than users in the age range of 25-40. In an example, the IPD database 974 and user demographics are stored in memory 934 of the eyewear device 100. In another example, IPD database 974 and user demographics are stored in the remote server system 998.

Figure 12B:
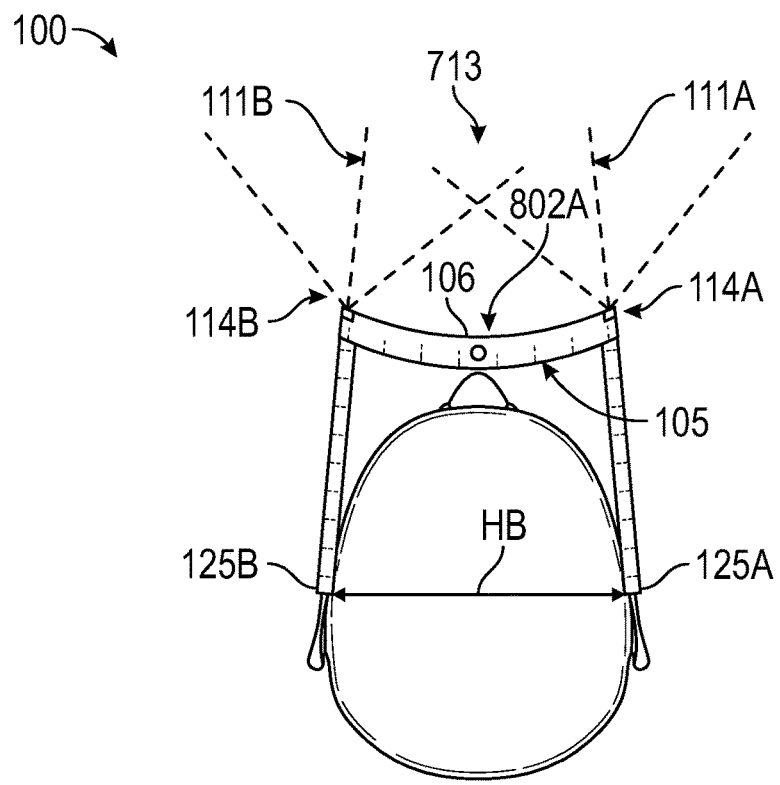
FIG. 12B is a top view of an example eyewear device depicting a deformation of a frame when worn on a user's head.

FIG. 12B depicts a top view of eyewear device 100 being worn by a user having a HB greater than the predetermined temple width and that results in bending or spatial deformation of the frame 105. In an example, the HB of the user is larger than the predetermined temple width, such as 155 mm. The frontward facing field of view (FOV) 111A and 111B of the visible light cameras 114A and 114B, respectively, are in a modified orientation with respect to one another due to the user HB bending frame 105. As shown, the FOV 111A and 111B are directed inwardly towards each other. The modified orientation of the visible light cameras 114A and 114B produce raw images 758A and 758B such that the overlap 713 is modified, for example, has a smaller area than the area of the baseline overlap 713. The CV algorithm 972 executed by processor 932 determines the HB based on the characteristics of the modified overlap 713, such as the reduced area. The CV algorithm 972 may also use a Visual Inertial Odometry (VIO) system that samples points in a scene's images and given a sequence of stereo frames to estimate bending of the frame 105. In an example, if the processor 932 determines the area of the modified overlap 713 is 1 percent smaller than the baseline overlap 713, the CV algorithm 972 determines that there is a 1-degree bend in the frame 105. In another example, the processor 032 can use orientation data from the IMU associated with the cameras 114A and 114B to determine the modified overlap 713.

In an example, the computer vision (CV) algorithm 972 determines the value of frame bending as a function of the overlap 713. A head size database 970 comprises data correlating frame bending to HB. The processor 932 determines the head breadth of the user from the determined frame bending value using the head size database 970. In an example, if the CV algorithm 972 determines a 1-degree bend in the frame 105, the processor 932 uses the head size database 970 to determines that the HB of the user is 160 mm, and then references the IPD database 974 to estimate an IPD based on the HB, such as 66 mm. If the CV algorithm 972 determines a 0.5-degree bend in the frame 105, the processor 932 uses the head size database 970 to determine that the HB is 150 mm, and then references the IPD database 974 to estimate an IPD based on the HB, such as 64 mm.

In another example, strain gauge 802A provides a measurement of the frame bending that is used by processor 932 as described with reference to FIG. 8C to measure the HB of the user. In an example, if the strain gauge 802A measures a 1-degree bend in the frame 105, the processor 932 uses head size database 970 to determine that the HB of the user is 160 mm, and then references the IPD database 974 to estimate an IPD value of 66 mm. In another example, if the strain gauge 802A measures a 0.5-degree bend in the frame 105, the processor 932 determines that the user HB is 150 mm, and then references the IPD database 974 to estimate an IPD value of 64 mm. Any other strain gauge locations previously described can be used to measure the bend of the frame 105 to determine the user HB.

Figure 13A:
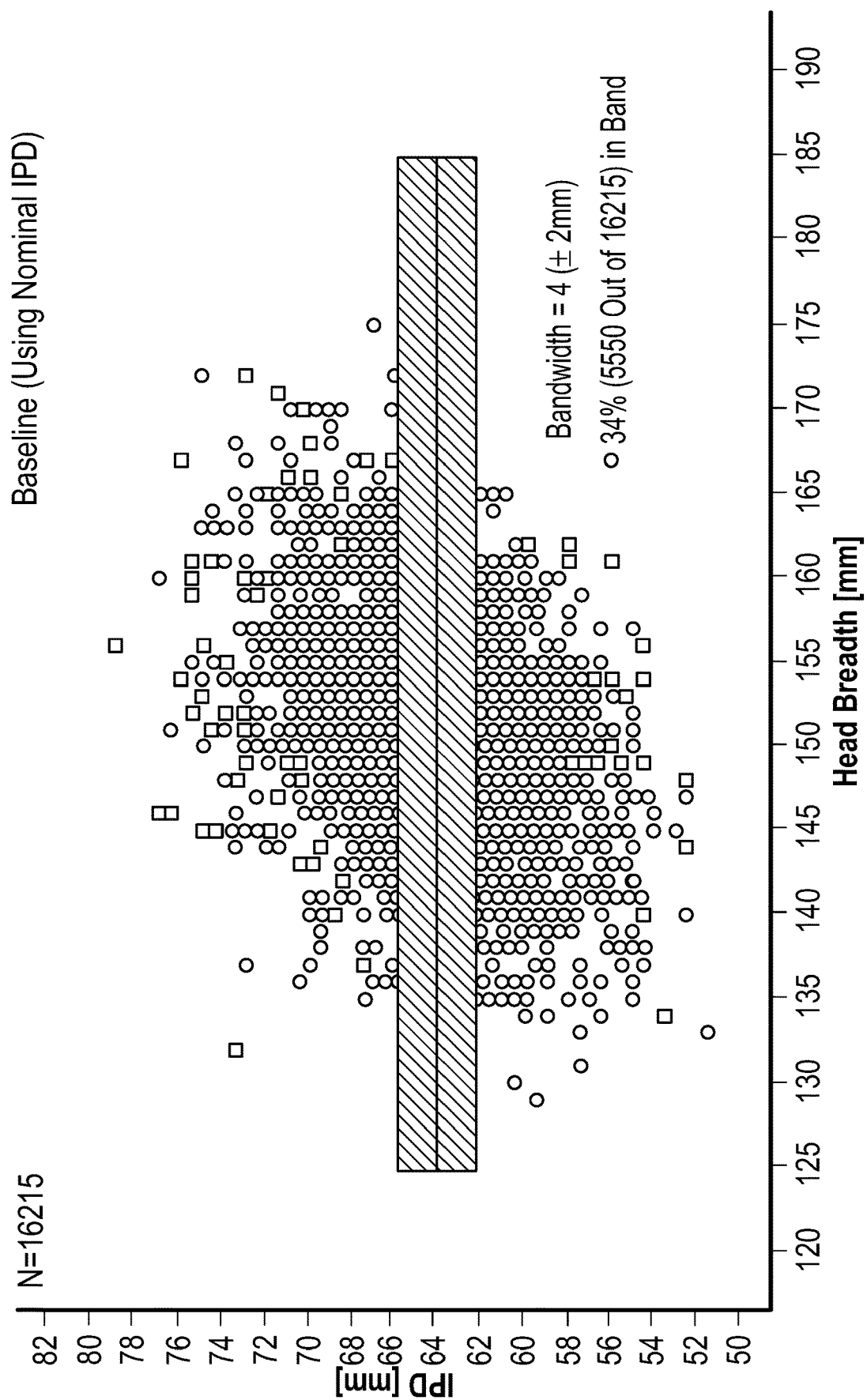
FIG. 13A is a plot of a nominal inter-pupillary distance (IPD) encompassing 34% of a United States population demographic data set.
Figure 13B:
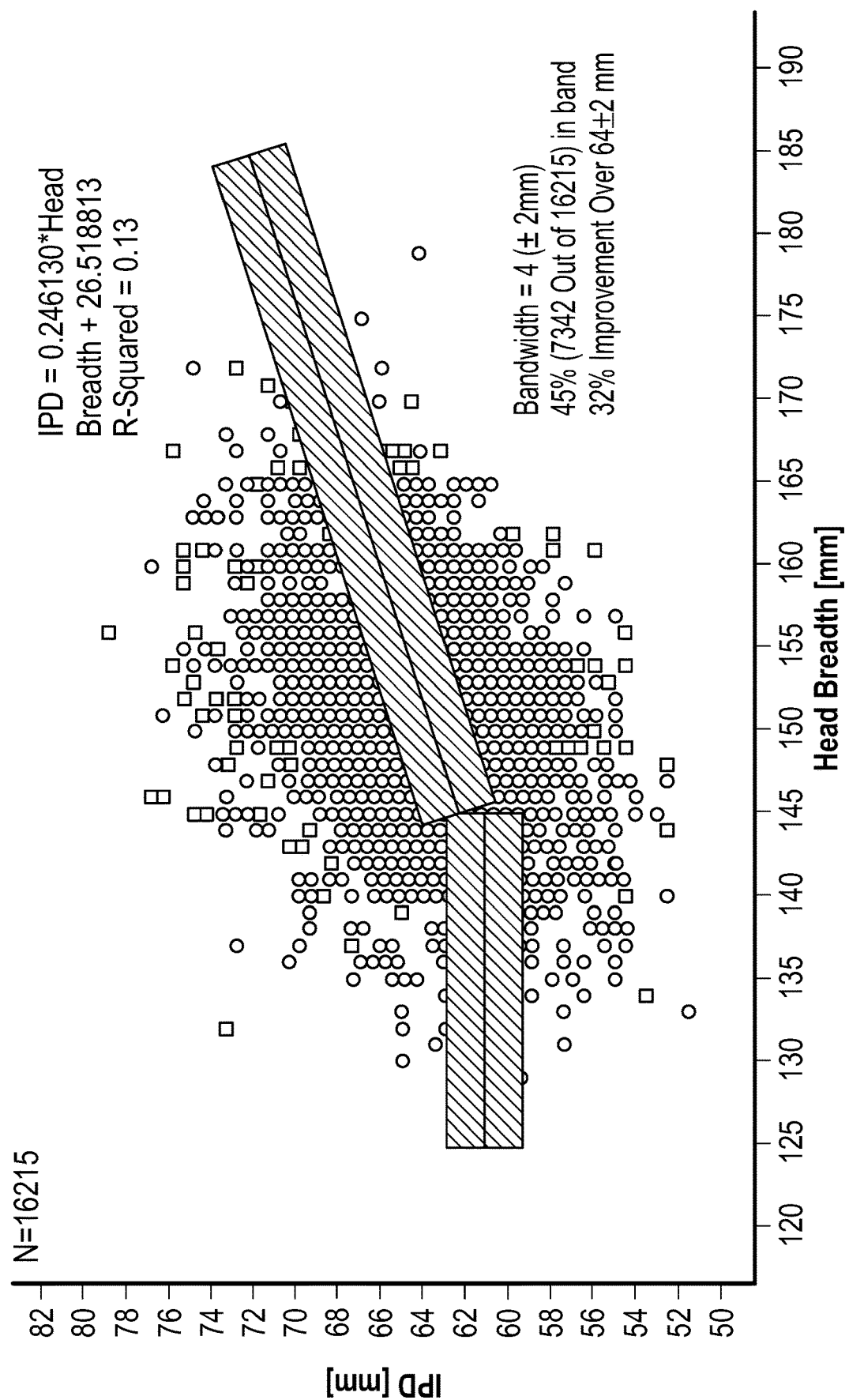
FIG. 13B is a plot of an inter-pupillary distance (IPD) as a function of determined head breadth encompassing 45% of the United States population demographic data set.

FIG. 13A illustrates a static IPD value of 64 mm that is not a function of HB. At this static value, 34% of a sample population of 16,215 people that is representative of the U.S. population is encompassed by the 64 mm IPD value with a 4 mm bandwidth. FIG. 13B illustrates the statistical improvement of implementing the determined IPD value as a function of HB determined by the CV algorithm 972 and strain gauge 802A. The determined IPD value is shown as a linear function of HB with a bandwidth of 4 mm that encompasses 45% of the sample population of 16,215 people that is representative of the U.S. population. The determined IPD value as a function of HB has a 32% improvement over the static IPD value of 64 mm.

FIG. 13B illustrates a set IPD value for HB below 145 mm. In an example, the frame 105 does not exhibit frame bending or a spatial deformation for users with a HB below 145 mm resulting in a default IPD value of 64 mm. For a user with a HB larger than 145 mm, frame 105 bends and causes a spatial deformation that is determined by processor 932, and processor 932 updates the IPD value based on the determined HB.

Figure 14:
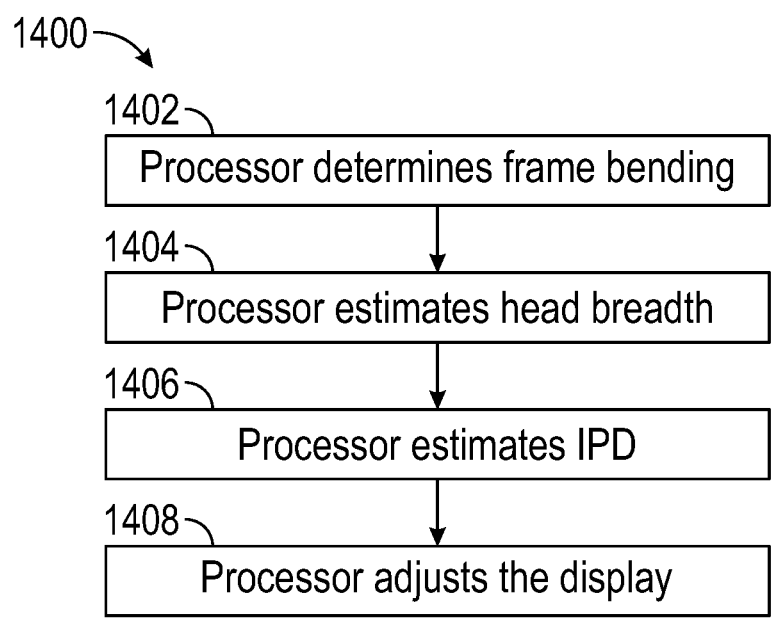
FIG. 14 is a flow chart showing a method of adjusting a display to improve a user viewing experience by estimating IPD of the user from a deformation of a frame.

FIG. 14 is a flowchart 1400 of a method of a processor estimating an IPD value of the user.

At block 1402, processor 932 determines the bending of frame 105. In one example, the bending and spatial deformation of frame 105 is measured by the strain gauge 802A. In another example, the bending and spatial deformation of frame 105 is determined by the CV algorithm 972 utilizing image data from cameras 114A and 114B and the IMU, such as raw images 758A and 758B creating overlap 713, as described. In another example, processor 932 determines the absence of bending and spatial deformation of frame 105 due to the user HB below the minimum measurable threshold.

At block 1404, processor 932 determines a user HB using the head size database 970 having data correlating frame bending to HB as described. The processor 932 determines the user HB based on the determined frame bending using the measurement from strain gauge 802A or using the CV algorithm 972. In one embodiment, the head size database 970 includes statistics of user profile data, such as HB of users having various ages and gender. Processor 932 determines a more accurate estimation of HB using the statistics of user profile data and the determination of frame bending.

At block 1406, processor 932 estimates the user IPD using IPD database 974 by correlating the determined HB to IPD. In an example, processor 932 adjusts the IPD value to the mean of the determined IPD range shown in FIG. 13B. In another example, processor 932 prompts the user on display 180C and 180D to adjust IPD value from a range determined from the HB. A bar slider to change the IPD value continuously, or a prompt of a few options to adjust the IPD value discreetly, is presented to the user. A virtual object is rendered on display 180C and 180D to allow the user to select the most comfortable IPD value for virtual object rendering. In another example, the user adjusted IPD value is saved to a user profile of the eyewear device 100.

At block 1408, processor 932 adjusts the displays 180C and 180D based on the determined IPD value to improve virtual object rendering, such as to better align a rendered object (e.g., a user's hand). The adjusted IPD value also reduces the VAM of the displays 180C and 180D. In an example, when processor 932 determines a different value of frame bending, the method starts again at block 1402. When rendering three dimensional (3D) objects for stereo vision, cameras 114A and 114B render the view once for the left eye and once for the right eye. Knowing the IPD, this distance between those two virtual cameras can be adjusted accordingly to match the actual IPD of the user. Otherwise, the display 180C and 180D uses the stored IPD values of the user profile.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An eyewear device comprising:
   a frame;
   a processor configured to:
   determine a deformation of the frame; and
   estimate an inter pupillary distance (IPD) of a user based on the determined frame deformation; and
   a display coupled to the frame configured to display an image as a function of the estimated IPD.

2. The eyewear device of claim 1, wherein the processor is configured to determine the frame deformation when the eyewear is worn by a user.

3. The eyewear device of claim 2, wherein the processor is configured to determine a head breadth (HB) of the user, and to determine the estimated IPD based on the HB.

4. The eyewear device of claim 3, further comprising a sensor coupled to the frame and configured to generate a sensor signal that is indicative of the HB.

5. The eyewear device of claim 4, wherein the sensor comprises a strain gauge sensor configured to measure a strain of the frame.

6. The eyewear device of claim 4, wherein the sensor comprises at least one camera configured to generate a camera image to determine the frame deformation using the image.

7. The eyewear device of claim 6, wherein the processor is configured to use a computer vision (CV) algorithm to determine frame deformation using the camera image.

8. The eyewear device of claim 3, further comprising a data table configured to correlate the frame deformation to the HB.

9. The eyewear device of claim 3, further comprising a data table configured to correlate the HB to the estimated IPD.

10. The eyewear device of claim 9, wherein the estimated IPD is configured to be selectively adjusted by the user.

11. A method of using an eyewear device comprising a frame, a processor configured to determine a deformation of the frame when worn by a user, and a display coupled to the frame configured to display an image, the method comprising the processor:
    determining a deformation of the frame;
    estimating an inter pupillary distance (IPD) of the user based on the determined frame deformation; and
    displaying an image as a function of the estimated IPD.

12. The method of claim 11, wherein the processor determines the frame deformation when the eyewear is worn by a user.

13. The method of claim 12, wherein the processor determines a head breadth (HB) of the user and determines the estimated IPD based on the HB.

14. The method of claim 13, wherein the eyewear device includes a sensor coupled to the frame and generating a sensor signal that is indicative of the HB.

15. The method of claim 14, wherein the sensor comprises a strain gauge sensor measuring a strain of the frame.

16. The method of claim 14, wherein the sensor comprises at least one camera generating a camera image.

17. The method of claim 16, wherein the processor uses a computer vision (CV) algorithm to determine frame deformation using the camera image.

18. The method of claim 13, wherein the processor uses a data table to correlate the frame deformation to the HB, and another data table to correlate the HB to the estimated IPD.

19. A non-transitory computer-readable medium storing program code which, when executed by a processor of an eyewear device comprising a frame and a display coupled to the frame configured to display an image, is operative to configure the eyewear device to perform the steps of:
   determining a deformation of the frame;
   estimating an inter pupillary distance (IPD) of a user based on the determined frame deformation; and
   displaying an image as a function of the estimated IPD.

20. The non-transitory computer-readable medium of claim 19, wherein the eyewear device includes a sensor coupled to the frame and is configured to generate a sensor signal that is indicative of a head breadth (HB) of the user, wherein the code is operative to determine the estimated IPD based on the HB.

\* \* \* \* \*